United States Patent
Bordin et al.

(10) Patent No.: US 12,168,629 B2
(45) Date of Patent: Dec. 17, 2024

(54) FIBER CEMENT FLOORING PRODUCTS AND METHODS FOR THE PRODUCTION THEREOF

(71) Applicants: ETEX SERVICES NV, Kapelle-op-den-Bos (BE); ETERNIT NV, Kapelle-op-den-Bos (BE)

(72) Inventors: Ruben Bordin, Mechelen (BE); Luc Van Der Heyden, Boortmeerbeek (BE)

(73) Assignees: Etex Services NV, Kapelle-op-den-Bos (BE); Eternit NV, Kapelle-op-den-Bos (BE)

( * ) Notice: Subject to any disclaimer, the term of this patent is extended or adjusted under 35 U.S.C. 154(b) by 0 days.

(21) Appl. No.: 18/102,810

(22) Filed: Jan. 30, 2023

(65) Prior Publication Data
US 2023/0174425 A1 Jun. 8, 2023

Related U.S. Application Data

(63) Continuation of application No. 16/475,256, filed as application No. PCT/EP2018/051974 on Jan. 26, 2018, now Pat. No. 11,597,680.

(30) Foreign Application Priority Data

Jan. 26, 2017 (EP) .................................. 17153233
Sep. 22, 2017 (EP) .................................. 17192726

(51) Int. Cl.
*C04B 28/00* (2006.01)
*C04B 14/04* (2006.01)
(Continued)

(52) U.S. Cl.
CPC ........ *C04B 16/0641* (2013.01); *C04B 14/043* (2013.01); *C04B 14/062* (2013.01);
(Continued)

(58) Field of Classification Search
CPC ........... C04B 28/04; C04B 2111/00405; C04B 2111/27; C04B 2111/82; E04C 2/06; E04F 15/10
(Continued)

(56) References Cited

U.S. PATENT DOCUMENTS 4,559,894 A 12/1985 Thompson
4,797,161 A 1/1989 Kirchmayr et al.
(Continued)

FOREIGN PATENT DOCUMENTS

CL 201801406 5/2018
CL 201801580 6/2018
(Continued)

*Primary Examiner* — James E McDonough
(74) *Attorney, Agent, or Firm* — Dilworth & Barrese, LLP

(57) ABSTRACT

The present invention relates to fiber cement flooring products. In particular, the present invention provides fiber cement flooring products, at least comprising cement and fibers, characterized in that these fiber cement flooring products comprise amorphous silica in an amount of between about 2 weight % and about 15 weight % compared to the total dry weight of the fiber cement composition of said fiber cement flooring product. The present invention further relates to methods for the production of such fiber cement flooring products as well as uses of such fiber cement flooring products in the building industry. The present invention further relates to fiber cement formulations and fiber cement materials, which are suitable for the production of fiber cement products for flooring applications.

16 Claims, 10 Drawing Sheets

(51) Int. Cl.

| | |
|---|---|
| *C04B 14/06* | (2006.01) |
| *C04B 14/10* | (2006.01) |
| *C04B 14/18* | (2006.01) |
| *C04B 14/20* | (2006.01) |
| *C04B 16/06* | (2006.01) |
| *C04B 28/02* | (2006.01) |
| *C04B 28/04* | (2006.01) |
| *C04B 40/00* | (2006.01) |
| *E04C 2/06* | (2006.01) |
| *E04F 15/10* | (2006.01) |
| *C04B 103/54* | (2006.01) |
| *C04B 111/00* | (2006.01) |
| *C04B 111/27* | (2006.01) |
| *C04B 111/60* | (2006.01) |
| *C04B 111/82* | (2006.01) |

(52) U.S. Cl.
CPC ............ *C04B 14/106* (2013.01); *C04B 14/18* (2013.01); *C04B 14/20* (2013.01); *C04B 16/0633* (2013.01); *C04B 28/02* (2013.01); *C04B 28/04* (2013.01); *C04B 40/0064* (2013.01); *E04C 2/06* (2013.01); *E04F 15/10* (2013.01); *C04B 2103/54* (2013.01); *C04B 2111/00405* (2013.01); *C04B 2111/27* (2013.01); *C04B 2111/60* (2013.01); *C04B 2111/82* (2013.01)

(58) Field of Classification Search
USPC .................................. 106/638, 713
See application file for complete search history.

(56) References Cited

U.S. PATENT DOCUMENTS

| | | |
|---|---|---|
| 6,197,107 B1 | 3/2001 | Stav et al. |
| 2004/0083677 A1 | 5/2004 | Bezubic et al. |
| 2009/0162602 A1* | 6/2009 | Cottier .................... C04B 28/02 |
| | | 428/411.1 |
| 2010/0162926 A1* | 7/2010 | Thomson ................ C04B 28/02 |
| | | 977/775 |
| 2019/0330107 A1 | 10/2019 | Bordin |
| 2021/0292234 A1 | 7/2021 | Endl |

FOREIGN PATENT DOCUMENTS

| | | |
|---|---|---|
| CN | 101050092 A | 10/2007 |
| CN | 101146965 A | 3/2008 |
| CN | 101172795 A | 5/2008 |
| CN | 101837604 A | 9/2010 |
| CN | 103787625 A | 5/2014 |
| CN | 204174883 U | 2/2015 |
| CN | 104876486 A | 9/2015 |
| CN | 105884247 A | 8/2016 |
| CN | 205591478 U | 9/2016 |
| EP | 0305209 A1 | 3/1989 |
| EP | 1047647 B1 | 3/2004 |
| EP | 3112330 A1 | 1/2007 |
| EP | 1914215 B1 | 4/2008 |
| EP | 2036871 B1 | 3/2009 |
| EP | 2172434 A1 | 4/2010 |
| EP | 1044939 B1 | 8/2011 |
| JP | 2006002317 A * | 1/2006 |
| KR | 100874883 B1 | 12/2008 |
| MX | /a/1999/008658 A1 | 4/1999 |
| RU | 2486150 C1 | 6/2013 |
| TH | 0901000520 | 2/2009 |
| WO | 02/070425 A1 | 9/2002 |
| WO | 2002/081399 A1 | 10/2002 |
| WO | 2004/033770 A1 | 4/2004 |
| WO | 2007/128679 A1 | 11/2007 |
| WO | 2008/046803 A1 | 4/2008 |
| WO | 2010/037628 A1 | 4/2010 |
| WO | 2012/1551103 A1 | 11/2012 |
| WO | 2018/011423 A1 | 1/2018 |
| WO | 2019/038260 A1 | 2/2019 |

* cited by examiner

FIBER CEMENT FLOORING PRODUCTS AND METHODS FOR THE PRODUCTION THEREOF

FIELD OF THE INVENTION

The present invention relates to fiber cement flooring products. The present invention further relates to methods for the production of such fiber cement flooring products as well as uses of such fiber cement flooring products in the building industry. The present invention further relates to fiber cement formulations and fiber cement materials, which are suitable for the production of fiber cement products for flooring applications.

BACKGROUND OF THE INVENTION

Commercially available floorings, such as laminate flooring (using high or medium density fiberboard or particle board as the core layer), have gained overwhelming success in the flooring market. The success of this product is credited to certain properties such as stain resistance, wear resistance, fire resistance, good cleanability, and the ability to use just about any type of printed design. In addition, the overall emission of organic compound vapor is low and the laminate flooring is considered color stable and environmentally friendly over other competing flooring products.

One concern, however, with commercially available laminate flooring is the moisture resistance of the finished product and the sensitivity of the raw materials (high or medium density fiberboard, paper, and particle board) to moisture during the manufacturing process. In some instances, the moisture can lead to some serious quality control issues and application restraints. For instance, the higher moisture content in the product, such as in the particle board or fiberboard, can cause blistering and adhesion failure of the melamine surface to the core. Also, higher moisture contents can lead to dimensional instability of the finished product, which then results in the cupping or doming of the product, which is extremely undesirable.

Suppliers of laminate flooring have attempted to overcome the above problems by developing laminate flooring having better moisture resistance by using melamine, phenolic, or isocyanate binders to partially replace urea resins present in the laminate flooring. While this improvement has made the product more moisture resistant, the current commercially available laminate floorings are still prone to moisture damage. For instance, laminate floor thickness can swell by more than 10% and water absorbency can exceed more than 15% according to the 24 hours water absorption test. Another attempted solution at the moisture resistance weaknesses of current laminate flooring has led some manufactures to apply a water-repellant material on the upper edges of the tongue and groove areas which further serve to resist any moisture penetration through joints. Still another attempted solution involves applying silicone caulk to seal the edges and voids of the laminate perimeter where the laminate flooring meets the wall. However, if very stringent installation instructions are not followed, the laminate flooring will still be subjected to moisture damage. Another weakness of laminate flooring is its susceptibility to break or chip at the corners of edges and the tongue and the groove profile because fibers in the high density fiber board are not cohesively bonded together with chemicals. Rather, they are pressed together primarily by tremendous pressure and heat.

An alternative commercially available flooring is acrylic impregnated wood flooring. Typical acrylic impregnated wood flooring is not an environmental and operational friendly product. In particular, it takes a long time to impregnate the liquid acrylic monomer into pores of the wood veneer and it is often difficult or impossible to penetrate the liquid fully to the desirable depth or uniformly into the pores of the wood. In addition, operators need to exercise tremendous caution for safely handling noxious liquid acrylic monomer and pay attention to the environmental consideration and government regulations. Due to such a time consuming and a labor intensive process, the product normally is very expensive.

SUMMARY OF THE INVENTION

The object of the present invention is to provide an improved esthetically appealing, strong and resilient flooring product that overcomes the above-mentioned weaknesses and disadvantages of current commercially available floorings.

In this respect, the present inventors have achieved to develop novel and inventive fiber cement flooring products, which have an elegant appearance and which are mechanically strong and highly resistant to cracks and wearing, even under harsh and adverse weather conditions and heavy pedestrian traffic.

In a first aspect, the present invention provides fiber cement flooring products, at least comprising cement, fibers and amorphous silica in an amount of between about 2 weight % and about 15 weight % compared to the total dry weight of the fiber cement composition. Indeed, the present inventors have surprisingly found that if amorphous silica is used in an amount of between about 2 weight % and about 15 weight % of the total dry weight of the composition of the fiber cement flooring product, the mechanical strength is significantly improved compared to products not containing amorphous silica. Moreover, amorphous silica in the amount of between about 2 weight % and about 15 weight % ensures a stronger interlaminar bonding between the different Hatschek layers present in the fiber cement products. This is very important to prevent potential delamination problems in the end products.

A further advantageous effect of amorphous silica in an amount of between about 2 weight % and about 15 weight % compared to the total dry weight of the composition of the fiber cement flooring product is that the flexural strength (i.e. elasticity) of the end product is significantly increased compared to products not containing amorphous silica. These advantages of the flooring products according to the present invention will become clear from the further description herein and, in particular, from the Example section further disclosed herein.

Accordingly, in particular embodiments, the fiber cement flooring products of the present invention comprise amorphous silica in an amount of about 2 weight % to about 10 weight %, more particularly in an amount of about 4 weight % to about 7 weight %, most particularly in an amount of about 7 weight % (weight % compared to the total dry weight of the fiber cement composition).

The inventors have however observed that amorphous silica in amounts higher than 15 weight % of the total dry weight of the composition of the fiber cement flooring product results in a significantly decreased porosity within the fiber cement composition. This may lead to several undesired properties like an increased degree of cracking under freeze-thaw conditions and a bad adhesion of post-treatment (hydrophobation) agents and/or coatings to the fiber cement surface.

In particular embodiments, the fiber cement flooring products according to the present invention further comprise limestone or $CaCO_3$ in an amount between about 5 weight % and 35 weight % compared to the total dry weight of the fiber cement composition of the fiber cement flooring product. In further particular embodiments, the fiber cement flooring products according to the present invention comprise limestone or $CaCO_3$ in an amount between about 5 weight % and 25 weight % compared to the total dry weight of the fiber cement composition of the fiber cement flooring product. The inventors have indeed observed that adding limestone or $CaCO_3$ in an amount between about 5 weight % and 35 weight % to the fiber cement compositions of the present inventions leads to a substantial increase of dimensional stability in the end products. In particular embodiments, the fiber cement flooring products according to the invention comprise limestone or $CaCO_3$ in an amount between about 8 weight % and 25 weight % compared to the total dry weight of the fiber cement composition of said fiber cement flooring product.

In particular embodiments, the fiber cement products of the present invention are air-cured fiber cement products. Indeed, the fiber cement products according to the present invention comprise fibers, which fibers preferably comprise synthetic fibers. These synthetic fibers inherently have a poor wet heat resistance and therefore remain intact and retain their full functionality under air-curing conditions.

Thus, in particular embodiments, the fiber cement flooring products according to the present invention at least comprise synthetic fibers, which contribute to the mechanical strength of the end products. Also, it has been observed by the present inventors that the presence of synthetic fibers results in a higher elastic deformation limit (i.e. increased bending until cracking), which is highly desirable in certain embodiments of the present invention (such as for instance in click flooring products).

In further particular embodiments, the fiber cement flooring products according to the present invention at least comprise polyvinyl alcohol fibers. In yet further particular embodiments, the fiber cement flooring products according to the present invention at least comprise two types of polyvinyl alcohol fibers. In still further particular embodiments, the fiber cement flooring products according to the present invention comprise polyvinyl alcohol fibers or polypropylene fibers or a combination of polyvinyl alcohol fibers and polypropylene fibers. Polypropylene fibers have a beneficial effect on the impact resistance of the fiber cement products of the present invention as will become clear from the Examples described herein.

In particular embodiments, the fiber cement flooring products according to the present invention further comprise wollastonite in an amount between about 5 weight % and 20 weight % compared to the total dry weight of the fiber cement composition of the fiber cement flooring product. It was indeed surprisingly found by the inventors that if adding wollastonite to the fiber cement formulations for making the fiber cement flooring products of the present invention results in a decrease in hygric and hydric movement of the end products when compared to products not containing wollastonite.

In particular embodiments, the fiber cement flooring products according to the present invention further comprise sepiolites. Sepiolites showed to have an improved rheological effect on the fiber cement slurry used for preparing the fiber cement flooring products of the present invention and moreover were found to result in a smoother surface texture of the end product.

In further particular embodiments, the fiber cement flooring products according to the present invention comprise on at least part of their outer surface one or more cured coating layers. These coating layers typically act as a barrier against water and as a protection layer against damage, but also potentially as a decorative layer.

In yet further particular embodiments, these coating layers may comprise at least one pigment.

In particular embodiments, the fiber cement flooring products according to the present invention further comprise a hydrophobic agent to improve water resistance and repellency.

In particular embodiments, the fiber cement flooring products of the present invention are coated with a layer of a hydrophobating agent. In particular, it has been found by the present inventors that fiber cement products comprising the specific combination of amorphous silica in the fiber cement composition and a hydrophobation agent (for instance through coating) results in a drastically decreased water absorption by non-hydrophobated areas of the fiber cement flooring products. Indeed, as will become clear from the Examples described herein, it was observed that the combination of amorphous silica in the fiber cement composition and a hydrophobation agent leads to a decreased water uptake by the non-coated edges of the flooring product (which edges may or may not be foreseen of a connecting element) and by the non-coated areas fiber cement layers under the coating.

In further particular embodiments, the fiber cement flooring products according to the present invention are coloured in the mass. In fact, in certain specific embodiments, the fiber cement products as designed by the present inventors and as disclosed herein are esthetically appealing because of their mass-coloured feature, whereby the surface of these products displays (at least part of) the inner texture and colour of the core materials, providing the products with a natural yet modern look. Mass-colouration of the products furthermore provides the additional advantage that any damage that may occur during the life-time of the products will be less visible compared to coated products, which are typically not coloured in the mass.

In a second aspect, the present invention provides methods for manufacturing fiber cement flooring products according to the present invention, at least comprising the steps of:
(i) Providing a fiber cement slurry at least comprising fibers, cement, water and 2 weight % and about 15 weight % compared to the total weight of solids in said slurry;
(ii) Manufacturing a fiber cement flooring product by means of a fiber cement production process;
(iii) Curing the fiber cement flooring product.

In particular embodiments, the mass-coloured fiber cement flooring products of the present invention, the fiber cement flooring products are fiber cement flooring planks. In alternative particular embodiments, the mass-coloured fiber cement flooring products of the present invention, the fiber cement flooring products are fiber cement flooring tiles.

In particular embodiments, the present invention provides methods for the manufacture of fiber cement flooring products, wherein step (ii) of manufacturing a fiber cement flooring product is performed by means of a fiber cement production process chosen from the group consisting of a Hatschek process, a Magnani process, an extrusion process and a flow-on method. In further particular embodiments, the present invention provides methods for the manufacture of fiber cement flooring products, wherein step (ii) of manufacturing a fiber cement flooring product is performed by means of a Hatschek production process.

In a third aspect, the present invention provides fiber cement flooring products obtainable by any of the methods as disclosed by the present invention.

In a fourth aspect, the present invention provides uses of the fiber cement flooring products as disclosed herein as building materials, in particular for outdoor flooring application (such as decking), indoor flooring applications (such as click flooring), fencing applications and/or covering applications and the like.

The independent and dependent claims set out particular and preferred features of the invention. Features from the dependent claims may be combined with features of the independent or other dependent claims, and/or with features set out in the description above and/or hereinafter as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
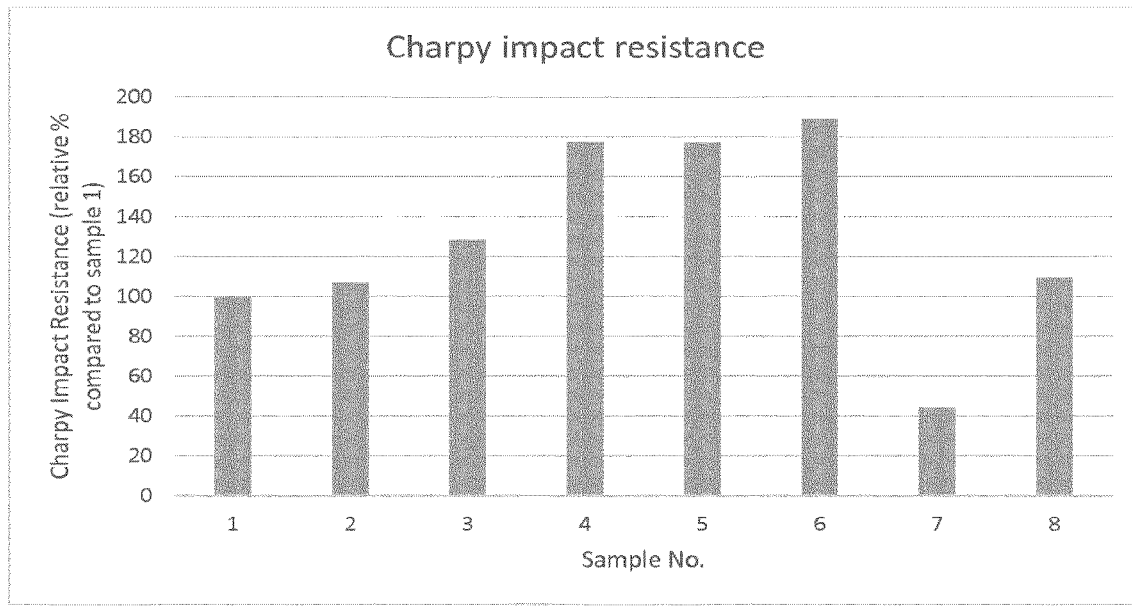
FIG. 1 shows a graph of the Charpy impact resistance (in relative % compared to Sample 1) of fiber cement samples 1 to 8 as produced with the compositions represented in Table 1. Charpy impact resistance was measured 29 days after production and air-curing (samples 1 to 6 and 8) or autoclave-curing (sample 7).

The same reference signs refer to the same, similar or analogous elements in the different figures.

DETAILED DESCRIPTION OF THE INVENTION

It is to be noted that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

The following terms are provided solely to aid in the understanding of the invention.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The recitation of numerical ranges by endpoints includes all numbers and fractions subsumed within the respective ranges, as well as the recited endpoints.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The terms "(fiber) cementitious slurry" or "(fiber) cement slurry" as referred to herein generally refer to slurries at least comprising water, fibers and cement. The fiber cement slurry as used in the context of the present invention may also further comprise other components, such as but not limited to, limestone, chalk, quick lime, slaked or hydrated lime, ground sand, silica sand flour, quartz flour, amorphous silica, condensed silica fume, microsilica, metakaolin, wollastonite, mica, perlite, vermiculite, aluminum hydroxide, pigments, anti-foaming agents, flocculants, and other additives.

"Fiber(s)" present in the fiber cement slurry as described herein may be for example process fibers and/or reinforcing fibers which both may be organic fibers (typically cellulose fibers) or synthetic fibers (polyvinyl alcohol, polyacrylonitrile, polypropylene, polyamide, polyester, polycarbonate, etc.).

"Cement" present in the fiber cement slurry as described herein may be for example but is not limited to Portland cement, cement with high alumina content, Portland cement of iron, trass-cement, slag cement, plaster, calcium silicates formed by autoclave treatment and combinations of particular binders. In more particular embodiments, cement in the products of the invention is Portland cement.

The terms "predetermined" and "predefined" as used herein when referring to one or more parameters or properties generally mean that the desired value(s) of these parameters or properties have been determined or defined beforehand, i.e. prior to the start of the process for producing the products that are characterized by one or more of these parameters or properties.

The term "cementitious" as in "cementitious product" or "cementitious material" as used herein refers to any product or material comprising cement, such as but not limited to Portland cement, cement with high alumina content, Portland cement of iron, trass-cement, slag cement, plaster, calcium silicates formed by autoclave treatment and combinations of particular binders. In more particular embodiments, cement in the products of the invention is Portland cement.

The terms "fiber cement product" and "fiber cement flooring product" as used herein refer to products at least comprising fibers and cement, which products are characterized in that they are particularly suitable for indoor and/or outdoor use as a flooring or as a flooring material and are resistant against harsh weather conditions and resistant against heavy pedestrian traffic. This high degree of wearability and strength is achieved by the different characteristics of the flooring products of the present invention, namely at least the presence of between 5 and 15 weight % of amorphous silica and, although optionally, between 5 and 25 weight % of $CaCO_3$ compared to the total dry weight of the fiber cement composition. It will be understood by the skilled person that the fiber cement flooring products of the present invention, in order to be suitable as a flooring product, have an increased thickness as compared to known fiber cement products, which are suitable for other applications, such as for façade or for roofing. In fact, a typical thickness for a fiber cement flooring product according to the present invention lies between about 5 mm and 25 mm, such as between 8 and 25 mm.

The fiber cement products as used in the context of the present invention may also further comprise other components, such as but not limited to, limestone, chalk, porous limestone, quick lime, slaked or hydrated lime, ground sand, silica sand flour, quartz flour, amorphous silica, condensed silica fume, microsilica, metakaolin, wollastonite, mica, perlite, vermiculite, aluminum hydroxide, pigments, anti-foaming agents, flocculants, and other additives.

The term "fiber cement layer" as used herein generally, and particularly in the context of the present invention, refers to any flat, optionally substantially rectangular, layer or cake essentially consisting of a fiber cement composition and having a thickness of at least about 1 mm, in particular between about 1 mm and 200 mm, more particularly between about 2 mm and about 150 mm, most particularly between about 4 mm and about 100 mm, such as between about 8 mm and about 10 mm.

A "Hatschek fiber cement layer" or a "Hatschek layer" as interchangeably used herein refers to a fiber cement layer (as defined herein), which is produced according to a Hatschek process, which at least comprises the steps of:
  (i) building a fiber cement film on a sieve, which sieve rotates so as to be in contact with a fiber cement slurry in a vat;
  (ii) transferring the fiber cement film from the sieve to the felt transport belt, and
  (iii) accumulating the fiber cement film on an accumulator roll via the felt transport belt.

In the context of the present invention, the use of the term "fiber cement film" refers to such a thin layer of fiber cement being applied onto the felt transport belt by one or more sieves rotating in a fiber cement slurry that is present in one or more vats of the Hatschek process. As may be understood from the aforementioned, series of thin fiber cement layers are produced on the one or more sieves from the Hatschek machine and subsequently superimposed and transferred from the one or more sieves to the transport belt, resulting in one or more uncured Hatschek fiber cement layers after accumulation on an accumulation roll. Thus, it will be clear that, when referring to "a fiber cement film" in the context of the present invention, it is to be understood that this term encompasses, where applicable, both the meaning of one single fiber cement film having a thickness of between about 0.01 mm and about 0.9 mm, such as in particular between about 0.05 mm and about 0.5 mm, such as between about 0.1 mm and about 0.4 mm, such as about 0.3 mm. (i.e. one thin layer of fiber cement also called a mono-layer, a single layer or a primary layer, that is applied onto the felt transport belt by a sieve from a vat of the Hatschek process) as well as the meaning of a layer comprising two or more superimposed fiber cement layers, each having a thickness of between about 0.01 mm and about 0.9 mm, such as in particular between about 0.05 mm and about 0.5 mm, such as between about 0.1 mm and about 0.4 mm, such as about 0.3 mm (i.e. two or more superimposed thin layers of fiber cement applied onto the felt transport belt by two or more sieves from a vat of the Hatschek process). The skilled person will understand, depending on the particular configuration of the Hatschek section, that when referring to processes of the invention in general both meanings of the term "fiber cement film" as described above will be applicable, while in more particular embodiments only one of both meanings are applicable. For instance, in a particular case where only one sieve is used in the Hatschek section for performing the processes of the invention, "a fiber cement film" as used herein means only one single layer having a thickness of between about 0.01 mm and about 0.9 mm that is applied onto the felt transport belt by the sieve from a vat of the Hatschek process. On the other hand, where two or more sieves are used in the Hatschek section for performing the processes of the invention, "a fiber cement film" as used herein means a superposition of two or more single layers, each having a thickness of between about 0.01 mm and about 0.9 mm, which are applied onto the felt transport belt by the sieve from a vat of the Hatschek process.

The term "water-permeable" as used herein when referring to a water-permeable (region of a) transport belt generally, and particularly in the context of the present invention, means that the material of which the water-permeable (region of the) belt is made allows water to flow through its structure to a certain extent.

The "water-permeability" as used herein when referring to the water-permeability of a (region of a) transport belt generally, and particularly in the context of the present invention, refers to the extent or degree to which the material of which the water-permeable (region of the) belt is made, allows water to flow through its structure. Suitable materials for water-permeable transport belts are known to the person skilled in the art, such as but not limited to felts.

A "non-hydrophobized (fiber cement) product" or a "non-hydrophobized fiber cement (film) layer" as used in the present context refers to a product, such as a fiber cement product or a fiber cement (film) layer, which has not been treated before, during or after its production, with a hydrophobizing agent. In particular, a "non-hydrophobized fiber cement product" or a "non-hydrophobized fiber cement sheet" as used herein will only comprise "fiber cement film layers", which are non-hydrophobized.

The terms "mass-coloured", "coloured in the mass", "through-coloured" when referring to a fiber cement product has the meaning that at least part of the, and preferably the entire, internal structure of that fiber cement product comprises at least one, i.e. one or more, pigment(s).

The terms "internal (fiber cement) structure", "inner (fiber cement) structure", "internal (fiber cement) mass" or "inner (fiber cement) mass" as referred to interchangeably herein are used to indicate the fiber cement material present in a fiber cement product, which material is not visible with the eye when looking at the product from the outside.

The terms "external (fiber cement) structure" or "external (fiber cement) surface" as referred to interchangeably herein are used to indicate the fiber cement material which is exposed and visible on the outside of a fiber cement product.

The recitations "mass-coloured fiber cement products" or "coloured fiber cement products" as used herein is meant to indicate fiber cement products that are coloured in the mass (as defined herein).

A "transparent pigment" as used herein is meant to indicate a pigment of which the pigment particles have the property of transmitting visible light. Thus, a "transparent pigment" as used herein is a pigment, of which the majority of pigment particles are smaller than the wave length of visible light.

An "opaque pigment" as used herein is meant to indicate a pigment of which the pigment particles do not have the property of transmitting visible light. Thus, an "opaque pigment" as used herein is a pigment of which the majority of pigment particles are greater than the wave length of visible light. A "semi-opaque pigment" (also referred to in the art as a semi-transparent pigment) as used herein is meant to indicate a pigment of which only a certain but significant percentage of pigment particles have the property of transmitting visible light. Thus, a "semi-opaque pigment" as used herein is a pigment of which a certain but significant percentage of pigment particles are greater than the wave length of visible light and of which the remaining percentage of pigment particles are smaller than the wave length of visible light.

The term "pigment" as used herein refers to a dry insoluble substance, usually pulverized, which when suspended in a liquid vehicle becomes a paint, ink, etc. Pigments typically consist of tiny solid particles that are used to enhance the appearance by providing color and/or to improve the physical (functional) properties of the paint or ink. Pigments used to provide color generally range from 0.2 to 0.4 microns in diameter. Functional pigments are typically 2-4 microns in diameter, but they may be as large as 50 microns.

The term "prime pigment" as used herein refers to any pigment (as defined herein), which is capable of providing whiteness and/or color to a substance while also contributing significantly to the hiding power of said substance. Prime pigments can be subdivided in white pigments and color pigments.

The term "white pigment" as referred to herein means a prime pigment, capable of scattering light and providing whiteness and hiding in flat or glossy paint or ink. White inorganic pigments include but are not limited to antimony pigments including Antimony White:$Sb_2O_3$; lead pigments (toxic) including White Lead$(PbCO_3)_2Pb(OH)_2$; titanium pigments including Titanium White: titanium(IV) oxide $TiO_2$ $_{and}$; zinc pigments including Zinc White: Zinc Oxide (ZnO).

The term "color pigment" as referred to herein means a prime pigment, capable of selectively absorbing light and providing color to a paint or ink. There are two main types of color pigments: organic pigments, which include the brighter colors but are not highly durable in exterior use and inorganic pigments, which are not as bright as organic colors but are the most durable exterior pigments.

The term "inorganic pigment" as used herein refers to naturally occurring mineral coloring compounds typically consisting of metallic salts. Inorganic pigments are usually oxides or sulphides of one or more metals.

Inorganic pigments include for instance but are not limited to:

Blue inorganic pigments:
  aluminum pigments, including ultramarine: a complex naturally occurring pigment of sulfur-containing sodio-silicate ($Na_{8-10}Al_6Si_6O_{24}S_{2-4}$); cobalt pigments, including Cobalt Blue and Cerulean Blue: cobalt(II) stannate;
  copper pigments, including Egyptian Blue: a synthetic pigment of calcium copper silicate ($CaCuSi_4O_{10}$) and Han Blue $BaCuSi_4O_{10}$; and
  iron pigments, including Prussian Blue: a synthetic pigment of ferric hexacyanoferrate ($Fe_7(CN)_{18}$);

Green inorganic pigments
  cadmium pigments, including Viridian: a dark green pigment of hydrated chromium(III) oxide ($Cr_2O_3$) and Cadmium Green: a light green pigment consisting of a mixture of Cromium Yellow (CrS) and Viridian ($Cr_2O_3$);
  chromium pigments, including Chrome Green;
  copper pigments, including Paris Green: copper(II) acetoarsenite ($Cu(C_2H_3O_2)_2 \cdot 3Cu(AsO_2)_2$) and Scheele's Green (also called Schloss Green): copper arsenite $CuHAsO_3$.

Yellow inorganic pigments
  arsenic pigments including Orpiment natural monoclinic arsenic sulfide ($As_2S_3$);
  cadmium pigments including Cadmium Yellow: cadmium sulfide (CdS);
  chromium pigments including Chrome Yellow: natural pigment of lead(II) chromate ($PbCrO_4$);
  cobalt pigments including Aureolin (also called Cobalt Yellow): Potassium cobaltinitrite ($Na_3Co(NO_2)_6$;

iron pigments including Yellow Ochre: a naturally occurring clay of hydrated iron oxide ($Fe_2O_3 \cdot H_2O$);

lead pigments including Naples Yellow;

titanium pigments including Titanium Yellow;

tin pigments including Mosaic gold: stannic sulfide ($SnS_2$);

Orange inorganic pigments cadmium pigments including Cadmium Orange: an intermediate between cadmium red and cadmium yellow: cadmium sulfoselenide;

chromium pigments including Chrome Orange: a naturally occurring pigment mixture composed of lead (II) chromate and lead(II) oxide. ($PbCrO_4+PbO$)

Red inorganic pigments cadmium pigments including Cadmium Red: cadmium selenide (CdSe);

iron oxide pigments including Sanguine, Caput Mortuum, Oxide Red, Red Ochre: anhydrous $Fe_2O_3$, Burnt Sienna: a pigment produced by heating Raw Sienna, Venetian Red;

lead pigments (toxic) including Red Lead: lead tetroxide, $Pb_3O_4$;

mercury pigments (toxic) including Vermilion: Synthetic and natural pigment: Occurs naturally in mineral cinnabar; Mercuric sulfide (HgS);

Brown inorganic pigments clay earth pigments (naturally formed iron oxides) including Raw Umber: A natural clay pigment consisting of iron oxide, manganese oxide and aluminum oxide: $Fe_2O_3+MnO_2+nH_2O+Si+AlO_3$; Raw Sienna: a naturally occurring yellow-brown pigment from limonite clay;

Black inorganic pigments

Carbon pigments including Carbon Black, Ivory Black, Vine Black, Lamp Black;

Iron Pigments including $Fe_3O_4$;

Titanium pigments: Titanium Black;

Grey inorganic pigments

Payne's grey: a mixture of Ultramarine and black or of Ultramarine and Sienna;

The term "organic pigment" as used herein refers to synthetic organic coloring compounds, which are carbon based molecules manufactured from petroleum compounds, acids, and other chemicals, usually under intense heat or pressure.

Organic pigments include for instance but are not limited to:

Yellow organic pigments:

Yellow Lakes, which are transparent pigments used as a yellow to cover other inks but not hide them, Tartrazine Yellow Lake (also called FD&C Yellow No. 5 and used as a dyestuff in foods), Hansa Yellows, and Diarylide Yellows, which are the most common yellow pigments used in printing inks. Fluorescent Yellow is also used in some specialty applications. Organic Yellows are commonly used to replace Chrome Yellows;

Orange organic pigments:

The most common orange pigment is Diarylide Orange, a transparent yet not very fast-to-light pigment. Other assorted orange materials tend to be used where orange pigments are necessary, and include DNA Orange, Pyrazolone Orange, Fast Orange F2G, Benzimidazolone Orange HL, and Ethyl Lake Red C;

Red organic pigments:

Reds include Para Reds, Toluidine Red, ["Permanent Red "R"], Carmine F.B., Naphthol Reds and Rubines, Permanent Red FRC, Bordeaux FRR, Rubine Reds, Lithol Reds, BON Red, Lithol Rubine 4B, BON Maroon, Rhodamine 6G, Lake Red C, BON Arylamide Red, Quinacrinone Magentas, Copper Ferrocyanide Pink, Benzimidazolone Carmines and Reds, Azo Magenta G, Anthraquinone Scarlet, and Madder Lakes;

Blue organic pigments:

'Blues'. Blues include Phthalocyanine Blues (the most commonly used group of organic blue pigments), PMTA Victoria Blue, Victoria Blue CFA, Ultramarine Blue, Indanthrene Blue, Alkali Blues, and Peacock Blue;

Violet organic pigments:

Violets overlap slightly with some of the bluer reds (such as Benzimidazolone Bordeaux HF 3R (see Benzimidazolone Carmines and Reds), and also include such pigments as PMTA Rhodamine, PMTA Violet (also known as Methyl Violet), Dioxazine Violet (RL) Carbazole Violet, Crystal Violet, Dioxazine Violet B, and Thioindigoid Red;

Green organic pigments:

A common series of greens are the Phthalocyanine Greens as well as the PMTA Greens;

Brown organic pigments:

Brown pigments include Diazo Brown and Benzimidazolone Brown HER;

The terms "extender pigment" or "filler pigment" as used herein refers to any pigment (as defined herein) having a low refractive index or opacity and therefore not providing color or hiding power to a substance. Extender or filler pigments appear transparent in a paint or ink. Extender pigments have significant positive effects on various properties of the paint for example, as described further below, mica can improve the water resistance of a film due to its "platy" particle shape and tendency to orient itself in overlapping layers horizontal to the surface. Extender pigments or filler pigments for instance include but are not limited to Barium Sulphate, Calcium Carbonate, Magnesium Silicate, Mica, Kaolin (China Clay), Asbestine, Talc, Silica/Quartz, Alumina Hydrate, Kalunite, Pumice, Bentonite, Vermiculite, and Glass Beads.

The term "silica" as used herein refers to silicium dioxide and has the chemical formula $SiO_2$.

The term "amorphous" as used herein is to be interpreted as "not crystalline", "non-crystalline" or "X-ray amorphous", which terms will be used interchangeably herein.

The term "amorphous silica" refers to any non-crystalline pure form of silicium dioxide ($SiO_2$). Pure forms of $SiO_2$ include for instance, but are not limited to, colloidal silica, precipitated silica, silica gel, pyrogenic silica, silica fume, quartz glass, fused silica and also the skeletons of Radiolaria and diatoms in the form of diatomaceous earth. These silica skeletons are comprised of an amorphous opaline substance.

The term "limestone" as used herein is sedimentary rock composed mainly of calcium carbonate ($CaCO_3$), usually in the form of calcite or aragonite. It may contain considerable amounts of magnesium carbonate (dolomite) as well; minor constituents also commonly present include clay, iron carbonate, feldspar, pyrite, and quartz.

The term "UV-curable" or "UV-cured" refers to a composition that can polymerize or has been polymerized upon application of UV irradiation. Typically, the polymerization reaction at least implies the presence of photo-polymerizable monomers or oligomers, together with photoinitiators and/or photosensitizers.

The term "solvent-based ink" as used herein refers to an ink comprising pigments in a colloidal suspension in a solvent other than water. The main solvent in solvent-based inks is typically one or more volatile organic compounds, such as but not limited to ethanol, ethyl acetate, ethylene glycol, glycol esters, hexane, isopropanol, methanol, methyl ethyl ketone, mineral spirits, naphthas, normal propyl acetate, normal propyl alcohol, toluene and xylene.

The term "water-based ink" as used herein refers to an ink comprising pigments in a colloidal suspension in water. Although the main solvent in water-based inks is water, there can also be other co-solvents present. These co-solvents typically are volatile organic compounds, such as but not limited to ethanol, ethyl acetate, ethylene glycol, glycol esters, hexane, isopropanol, methanol, methyl ethyl ketone, mineral spirits, naphthas, normal propyl acetate, normal propyl alcohol, toluene and xylene.

The terms "UV-cured ink" or "UV-curable ink" as interchangeably used herein refer to an ink composition that can polymerize upon application of UV irradiation. A "UV-cured ink" or "UV-curable ink" as used herein refers to an ink composition which does not comprise a solvent but rather comprises one or more pigments embedded in a matrix of photo-polymerizable monomers and/or oligomers, and photoinitiators and/or photosensitizers.

The invention will now be further explained in detail with reference to various embodiments. It will be understood that each embodiment is provided by way of example and is in no way limiting to the scope of the invention. In this respect, it will be clear to those skilled in the art that various modifications and variations can be made to the present invention without departing from the scope or spirit of the invention. For instance, features illustrated or described as part of one embodiment, can be used in another embodiment to yield a still further embodiment. Thus, it is intended that the present invention covers such modifications and variations as encompassed within the scope of the appended claims and equivalents thereof.

The present inventors have managed to develop fiber cement formulations and fiber cement products, which are particularly suitable for flooring applications. Indeed, the fiber cement products of the present invention do not suffer from the undesirable consequences of moisture, humidity and varying weather conditions, which typically lead to swelling, deformation, moss and fungi growth, rotting, splitting, splintering, cracking and/or termite damage, which are typically encountered with the known flooring products.

Moreover, the fiber cement flooring products of the present invention have a good mechanical strength and impact resistance, are highly wearproof and are esthetically appealing. These advantages will become clear from the Examples as further described herein.

In a first aspect, the fiber cement products of the present invention are characterized in that they comprise, apart from fibers and cement, between about 2 weight % and about 15 weight % of amorphous silica (percentage of the total weight of the dry components of the formulation). Indeed, the present inventors have surprisingly found that if amorphous silica (as defined herein) is used in an amount of between about 2 weight % and about 15 weight % of the total dry weight of the composition of the fiber cement flooring product, the mechanical strength is significantly improved compared to products not containing amorphous silica. Moreover, amorphous silica in the amount of between about 2 weight % and about 15 weight % ensures a stronger interlaminar bonding between the different Hatschek layers present in the fiber cement products. This is very important to prevent potential delamination (i.e. splitting between the different Hatschek layers) in the end products.

A further advantageous effect of amorphous silica in an amount of between about 2 weight % and about 15 weight % compared to the total dry weight of the composition of the fiber cement flooring product is that the flexural strength and the high strain and stress elastic limits of the end product are significantly increased compared to products not containing amorphous silica. A higher elastic deformation limit is extremely important for flooring products since such products have to be able to resist strong local surface forces and impacts.

These advantages of the flooring products according to the present invention will become clear from the further description herein and, in particular, from the Example section further disclosed herein. Accordingly, in particular embodiments, the fiber cement flooring products of the present invention comprise amorphous silica in an amount of about 2 weight % to about 10 weight %, more particularly in an amount of about 4 weight % to about 7 weight %, most particularly in an amount of about 7 weight % (weight % compared to the total dry weight of the fiber cement composition).

In particular embodiments, the fiber cement flooring products of the present invention further comprise limestone or $CaCO_3$ in an amount between about 5 weight % and 35 weight % compared to the total dry weight of the fiber cement composition of said fiber cement flooring product. In further particular embodiments, the fiber cement flooring products according to the invention comprise limestone or $CaCO_3$ in an amount between about 8 weight % and 25 weight % compared to the total dry weight of the fiber cement composition of said fiber cement flooring product. In yet further particular embodiments, the fiber cement flooring products according to the invention comprise limestone or $CaCO_3$ in an amount between about 8 weight % and 20 weight % compared to the total dry weight of the fiber cement composition of said fiber cement flooring product.

The inventors have indeed observed that adding limestone or $CaCO_3$ in an amount between about 5 weight % and 25 weight % to the fiber cement compositions of the present inventions leads to a substantial increase of dimensional stability in the end products.

In particular embodiments, the fiber cement products of the present invention are air-cured fiber cement products. The fiber cement products according to the present invention comprise fibers. In particular embodiments, the fibers preferably comprise synthetic fibers. These synthetic fibers inherently have a poor wet heat resistance and therefore remain intact and retain their full functionality only under air-curing or room temperature curing conditions.

Thus, in particular embodiments, the fiber cement flooring products according to the present invention comprise fibers comprising synthetic fibers. It has been observed that the presence of synthetic fibers contributes significantly to an improved mechanical strength and a higher elastic deformation limit (i.e. increased bending until cracking) of the end products. In further particular embodiments, the fiber cement flooring products according to the present invention comprise at least two different types of synthetic fibers.

In further particular embodiments, the fiber cement flooring products according to the present invention at least comprise polyvinyl alcohol fibers. In yet further particular embodiments, the fiber cement flooring products according to the present invention at least comprise two types of polyvinyl alcohol fibers. In still further particular embodiments, the fiber cement flooring products according to the present invention comprise polyvinyl alcohol fibers or polypropylene fibers or a combination of polyvinyl alcohol fibers and polypropylene fibers. Polypropylene fibers have a beneficial effect on the impact resistance of the fiber cement products of the present invention as will become clear from the Examples described herein.

In particular embodiments, the fiber cement products of the present invention comprise from about 0.1 to about 5 weight %, such as particularly from about 0.5 to about 4 weight % of synthetic fibers, such as more particularly between about 1 to 3.5 weight % of synthetic fibers, such as most particularly between about 2.0 to 3.0 weight %, such as 2.5 weight %, of synthetic fibers with respect to the total weight of the fiber cement product.

According to further particular embodiments, the fiber cement products according to the invention are characterized in that they comprise synthetic fibers in a weight % of about 0.1 to about 5 with respect to the total weight of the fiber cement product. In particular embodiments, these fibers are selected from the group consisting of polypropylene, polyvinylalcohol polyacrylonitrile fibers, polyethyelene, polyamide fibers, polyester fibers, aramide fibers and carbon fibers.

In further particular embodiments, natural fibers, such as cellulose fibers may in addition be added to the fiber cement formulations of the present invention. In these particular embodiments, the fiber cement products of the present invention may comprise from about 2 to about 5 weight %, such as particularly about 2 to about 4 weight % of cellulose fibers, such as more particularly about 3 weight % of cellulose fibers with respect to the total weight of the fiber cement product. These cellulose fibers may be derived from wood or annual plants.

In further particular embodiments, additional fibers may be added to the cement formulations and may be selected from the group consisting of glass fibers, rockwool fibers, slag wool fibers, wollastonite fibers, ceramic fibers and the like. In further particular embodiments, the fiber cement products of the present invention may additionally comprise fibrils fibrids, such as for example but not limited to, polyolefinic fibrils fibrids % in a weight % of about 0.1 to 3, such as "synthetic wood pulp".

In particular embodiments, the fiber cement flooring products of the present invention comprise a combination of at least two different types of synthetic fibers.

In further particular embodiments, the fiber cement flooring products of the present invention comprise a combination of at least two different types of synthetic fibers, wherein the at least two different types of synthetic fibers are polypropylene fibers and polyvinyl alcohol fibers. In still further particular embodiments, the fiber cement flooring products of the present invention at least comprise polypropylene fibers in an amount of about 0.1 weight % to about 1 weight % (weight % compared to the total dry weight of the fiber cement composition) and polyvinyl alcohol fibers in an amount of about 0.1 weight % to about 3 weight % (weight % compared to the total dry weight of the fiber cement composition). In yet further particular embodiments, the fiber cement flooring products of the present invention at least comprise a combination of polypropylene fibers in an amount of about 0.5 weight % (weight % compared to the total dry weight of the fiber cement composition) and polyvinyl alcohol fibers in an amount of about 2 weight % to about 2.5 weight % (weight % compared to the total dry weight of the fiber cement composition).

In yet further particular embodiments, the fiber cement flooring products of the present invention comprise a combination of polypropylene fibers in an amount of about 0.5 weight % (weight % compared to the total dry weight of the fiber cement composition), polyvinyl alcohol fibers with a thickness of about 6 dtex to about 8 dtex in an amount of about 1 weight % to about 1.5 weight % (weight % compared to the total dry weight of the fiber cement composition) and polyvinyl alcohol fibers with a thickness of about 0.5 dtex to about 2 dtex in an amount of about 1 weight % (weight % compared to the total dry weight of the fiber cement composition).

In still further particular embodiments, the fiber cement flooring products of the present invention comprise a combination of polypropylene fibers with a thickness of about 12 dtex to about 18 dtex in an amount of about 0.5 weight % (weight % compared to the total dry weight of the fiber cement composition), polyvinyl alcohol fibers with a thickness of about 6 dtex to about 8 dtex, in an amount of about 1 weight % to about 1.5 weight % (weight % compared to the total dry weight of the fiber cement composition) and polyvinyl alcohol fibers with a thickness of about 0.5 dtex to about 1 dtex in an amount of about 1 weight % (weight % compared to the total dry weight of the fiber cement composition).

In yet further particular embodiments, the fiber cement flooring products of the present invention comprise a combination of polypropylene fibers with a thickness of about 12 dtex to about 18 dtex in an amount of about 0.5 weight % (weight % compared to the total dry weight of the fiber cement composition), polyvinyl alcohol fibers with a thickness of about 7 dtex, in an amount of about 1 weight % to about 1.5 weight % (weight % compared to the total dry weight of the fiber cement composition) and polyvinyl alcohol fibers with a thickness of about 0.8 dtex to about 1 dtex in an amount of about 1 weight % (weight % compared to the total dry weight of the fiber cement composition).

As will become clear from the Examples described further herein, the specific combination of polypropylene fibers and polyvinyl alcohol fibers has a particularly beneficial effect on the mechanical performance (mechanical strength and impact resistance) of the fiber cement flooring products as disclosed by the present invention.

In particular embodiments, the fiber cement flooring products according to the present invention further comprise wollastonite in an amount between about 5 weight % and 20 weight % compared to the total dry weight of the fiber cement composition of the fiber cement flooring product. In further particular embodiments, the fiber cement flooring products according to the present invention comprise wollastonite in an amount between about 7 weight % and about 12 weight %, such as about 8 weight %, compared to the total dry weight of the fiber cement composition of the fiber cement flooring product. It was indeed surprisingly found by the inventors that if adding wollastonite to the fiber cement formulations for making the fiber cement flooring products of the present invention results in a decrease in hygric movement of the end products when compared to products not containing wollastonite. In this way, adding the above mentioned amounts of wollastonite to the fiber cement compositions for the production of the flooring products of the present invention, has resulted in the advantageous effect that, when interconnecting several flooring elements so as to form a floor, the expansion joints between these different flooring elements (i.e. the distances between for instance flooring planks) can be made less wide because the products are more dimensionally stable. The esthetic appearance of a floor with narrower expansion joints is much more attractive and therefore a major improvement.

In particular embodiments, the fiber cement flooring products according to the present invention further comprise sepiolites. Sepiolites showed to have an improved rheological effect on the fiber cement slurry used for preparing the fiber cement flooring products of the present invention and moreover were found to result in a smoother surface texture of the end product. In further particular embodiments, the fiber cement flooring products of the present invention comprise sepiolites in an amount of between about 1 weight % and about 4 weight %, such as about 2 weight %, compared to the total dry weight of the fiber cement composition of the fiber cement flooring product.

In particular embodiments, the fiber cement flooring products according to the present invention may comprise on at least part of their outer surface one or more cured coating layers.

In these particular embodiments, the surface of the fiber cement flooring products is coated with a first coating, which functions as a primer layer. A primer coating typically improves the stability of the surface, provides a better adhesion for subsequent top coating layers and provides a barrier against water uptake and migration of dissolved ions.

Thus, in the embodiments of the present invention where the fiber cement products are coated, the surface of the fiber cement flooring products of the present invention may be provided with at least one layer of a primer.

The person skilled in the art knows suitable primer materials that are commercially available. In particular embodiments, the fiber cement flooring products of the present invention are provided with a layer of a first coating, which is a waterborne acrylic primer.

In other particular embodiments, the fiber cement flooring products of the present invention are provided with a layer of a first coating, which is a waterglass primer, i.e. a primer based on a salt of an alkalimetal and silica, such as but not limited to a waterborne potassium silicate primer, a waterborne sodium silicate primer or a waterborne lithium silicate primer, to which small amounts of a styrene acrylic resin, such as for example a butadiene styrene acrylic resin are optionally added.

In yet other particular embodiments, the fiber cement flooring products of the present invention are provided with a layer of a first coating, which is a solid content aliphatic isocyanate primer.

In still other particular embodiments, the fiber cement flooring products of the present invention are provided with a layer of a first coating, which is a UV-curable urethane acrylic primer, a UV-curable pure acrylic primer, or a UV-curable polyester acrylic primer.

In some embodiments, the primer itself can be imprinted with a decor. In such embodiments, it is intended that the imprinted decor still remains visible by its relief through the further coating layers (which are applied onto the primer layer) and thereby provides the flooring products with an esthetically attractive appearance.

Over the at least one layer of a first coating (i.e. the primer), one or more layers of a second coating can be applied. The second coating can be a radiation-curable polyacrylate-containing coating or polymeric coating having a hardness gradient.

Thus, in particular embodiments, the fiber cement flooring products are coated with a second coating, which is a radiation curing acrylate system, for instance by applying one or more polyacrylate top coating layers. Radiation curing can be achieved, for example, by electron ray treatment, excimer treatment or UV ray treatment.

In further particular embodiments, the fiber cement flooring products are coated with one or more layers of a second coating, which is a solid content aliphatic isocyanate coating.

In still other particular embodiments, the fiber cement flooring products are coated with one or more layers of a second coating, which is a UV-curable urethane acrylic coating, a UV-curable pure acrylic coating, or a UV-curable polyester acrylic coating.

In alternative particular embodiments, the fiber cement flooring products are provided with a second coating, which is a conventionally curable polymeric coating (with hardness gradient). The curing or hardening of a polymeric layer will be understood as a chemical reaction that takes place during polymerization. This has to be distinguished from drying of such layers, in which simply the content of water will be reduced or removed.

Thus, in particular embodiments, on top of the at least one layer of a first coating (i.e. the primer), one or more layers of a second coating may be applied, which second coating is a waterborne acrylic top coat layer.

In other particular embodiments, the fiber cement flooring products of the present invention are provided with one or more layers of a second coating, which is a waterglass-based coating, such as but not limited to a waterborne potassium silicate coating, a waterborne sodium silicate coating or a waterborne lithium silicate coating.

Typically, there will be one or several layers of the second coating applied on top of the primer (i.e. first coating). The second coating can further comprise corundum or silicate so as to increase abrasion resistance and/or scratch resistance.

Finally, the fiber cement flooring products are provided with a protective top coating. For example, as a protective layer, a radiation curing or e-beam curing urethane acrylate coating(s) can be applied on the surface of any previous layer or on the core upper surface of the product to provide the required surface properties such as scratch and wear resistance, scuff resistance, stain and chemical resistance and appearance retention. The coating(s) can incorporate the abrasive resistance particles in the urethane for better surface protection that typically has abrasion level of 300-500 cycles per NALFA test.

Accordingly, it will be clear that the coating system applied to the fiber cement flooring products of the present invention does not inevitably comprise a single layer, but can comprise multiple different layers that act together to provide an adhesive function, a protective function and/or a decorative function.

The coating compositions described herein can be applied to a surface of a fiber cement product using a brush, blade, roller, sprayer (e.g., air-assisted or airless, electrostatic), vacuum coater, curtain coater, flood coater or any suitable device that promotes an even distribution of the coating composition over the surface, even if the surface is damaged, worn, or cracked. The coating compositions may be applied to provide a smooth surface, colored surface or textured surface. A portion or an entire surface of the fiber cement product may be coated at one time. In addition or as an alternative, all or a portion of the surface may be coated more than one time to achieve the desired thickness, gloss, and/or surface effect. The amount of coverage obtained by a quantity of the composition will vary depending on the desire and/or condition of the surface to be covered and the thickness of the coating applied.

In particular embodiments, the fiber cement flooring products of the present invention are provided with a decorative element, such as but not limited to a decorative pattern, a decorative print or a decorative design. Alternatively, it is also possible to apply coatings without an own decorative decor, so that these serve as pure protective layers.

Decorative elements will typically be applied after the primer, but before the protective layers, in order to preserve the decorative aspect for as long as possible.

In particular embodiments, one or more of the coating layers of the fiber cement flooring products of the present invention are imprinted with a decorative pattern, such as a real wood decor or a stone or tile decor.

In particular embodiments, one or more of the coating layers of the fiber cement flooring products of the present invention are provided with a decorative design. A decorative design can be printed directly on the surface of the coated fiber cement flooring products using any type of printing technique, such as embossing gravure printing, transfer printing, digital printing (such as digital ink-jet printing), flexo printing, and the like. The ink compositions suitable for printing or colouring the fiber cement flooring products of the present invention are essentially alkali-resistant, i.e. resistant to a pH of about 8 or higher, such as resistant to a pH of about 9 or higher, such as resistant to a pH of about 10 or higher, such as resistant to a pH of about 11 or higher, more particularly resistant to a pH of higher than about 12 or higher than about 13. Also, the pigments in the ink compositions suitable for printing or colouring the fiber cement flooring products of the present invention are essentially alkali-resistant, i.e. resistant to a pH of about 8 or higher, such as resistant to a pH of about 9 or higher, such as resistant to a pH of about 10 or higher, such as resistant to a pH of about 11 or higher, more particularly resistant to a pH of higher than about 12 or higher than about 13.

On top of the printed design, a protective coating, such as a polyurethane type coating with or without wear resistant particles in the coating, can be applied.

Decorative element(s) such as wood grains and/or knots texture can be embossed (e.g., mechanical or chemical embossing), wherein the design can then be directly printed on the surface of a fiber cement flooring product using, for example, a non-contact type digital printing technology.

Another option is to incorporate pigments into the fiber cement slurry during the production process and creating a decorative look by disturbing the material flow during production of the fiber cement flooring product. The decorative element can be any design, like natural appearances, stone, brick, ceramic, wood, marble, and the like or can be other designs common to or used by the floor industry. The design and overall upper layers can be textured, such as embossed, engraved, sandblasted and the like.

In particular embodiments, the fiber cement flooring products according to the present invention may alternatively, i.e. instead of a coating system, comprise one of the following: (a) a high pressure laminate construction that is comprised of an impregnated underlayer Kraft paper, a printed decorative layer, and an impregnated protective overlay compressed together with heat and pressure to become one single layer; (b) a wood veneer; or (c) a vulcanized cellulose layer that is made from a number of plies of paper treated with zinc chloride, an acid to make the surfaces of the paper gummy and sticky, wherein the gummy plies are then pressed together.

Accordingly, in certain embodiments, the fiber cement products of the present invention comprise a laminate on top of their surface. A print layer can be affixed to the top surface of the fiber cement product, wherein the print layer has a top surface and a bottom surface. The print layer, preferably, is an aminoplast resin impregnated printed paper. Preferably, the print layer has a printed design. The printed design can be any design which is capable of being printed onto the print layer. The print layer is also known as a decor print layer. Generally, the print layer can be prepared by rotogravure printing techniques or other printing means such as digital printing. Once a design is printed on the paper, the paper can then be impregnated with an aminoplast resin or mixtures thereof. Preferably, the aminoplast resin is a blend of urea formaldehyde and melamine formaldehyde. The print paper, also known as the Deco paper, preferably, should have the ability to have liquids penetrate the paper such as a melamine liquid penetrating in about 3 to 4 seconds and also maintain a wet strength and even fiber orientation to provide good reinforcement in all directions. Preferably, the resin used for the impregnation is a mixture of urea formaldehyde and melamine formaldehyde resins. Combining urea resins with melamine resins in a mixture or using a double impregnation (i.e., applying one resin after another sequentially) provides a positive interaction in controlling shrinkage and reducing cloudiness. Any type of paper can be used in the present invention. Preferably, the type of paper used is 80 $g/m^2$ weight and includes a thickness of 0.16 mm.

Located optionally on the top surface of the print layer is a protective layer. The protective layer is an overlay paper, which upon being affixed onto the print layer, is clear in appearance. The overlay paper is, preferably, a high abrasive overlay which, preferably, has aluminum oxide embedded in the surface of the paper. In addition, the paper can be impregnated with an aminoplast resin just as with the print layer. Various commercial grades of high abrasive overlays are preferably used such as those from Mead Specialty Paper.

A multilayered overlay can be used to provide printed decoration and protection for the product. This overlay can have a printed paper as a decorative layer. On the top surface of the printed paper can be a layer of urethane acrylate containing aluminum oxide for enhanced abrasion resistance. Above this layer can be another layer of urethane acrylate without aluminum oxide for improved surface visuals. Below the print layer can be a primer layer or an adhesive layer to enhance the bond to the surface of the fiber cement product. The multilayered overlay can be produced by building layers of the primer liquid, and the two acrylic layers as liquid onto the print layer and then e-beam curing to produce the solid cured product.

As an option, an underlay can be located and affixed between the bottom surface of the print layer and the top surface of the fiber cement product. Preferably, the underlay is present and is paper impregnated with an aminoplast resin as described above with respect to the print layer and overlay. Preferably, the underlay is Kraft paper impregnated with aminoplast resins or phenolics. The underlay is especially preferred when extra impact strength resistance is required.

Other types of layers, which can be used in the present invention, such as wood veneer and vulcanized cellulose layers, can include the same components described above with respect to the laminate. Wood veneers used as the top layer can be any type of species such as oak, maple, cherry, hickory, beech, pine, walnut, mahogany, chestnut, and teak and the like. The veneer on the top can be decorated with a printed design to highlight the grains or knots or to mimic certain wood species or to emboss the surface to create vintage appearance and the like.

In particular embodiments, wherein the top layer is a laminate, the laminate can be prepared by, for instance, any process customarily used to manufacture laminate films such as a continuous double belt press. In this double belt press system, an isobaric system provides a steady uniform pressure effect on each point of the treated surface of the laminate. Embossing of the laminate can be accomplished by embossed release paper or the belt of the double belt press can be embossed to produce surface textures. In a continuous double belt press, the simultaneous heating of the laminate with proper dwell time and pressure forms the laminate film which then can be rolled up for subsequent application. Once the laminate is formed it can be applied onto the surface of the fiber cement product and is preferably affixed by any means, such as with an adhesive. Preferably the adhesive is a hot melt adhesive such as hot melt glue like hot melt polyurethane glue.

Wood veneer and vulcanized cellulose can be laminated in a similar manner. These products may be provided as coils or as individual strips.

According to particular embodiments of the present invention, the fiber cement flooring products of the present invention can be provided on the rear side with a waterproof layer to block the penetration of water. The sealing of the rear side can be achieved by acrylic coating; a PVC film can be concealed by polyurethane melt adhesive; a glass non-woven provided with polyurethane adhesive provides a particularly robust protection.

In particular embodiments, the fiber cement flooring products according to the present invention further comprise a hydrophobic agent to improve water resistance and repellency. Suitable hydrophobic agents are known in the art and can be applied either in-mass during the production of the fiber cement products or as a post-treatment cover layer(s).

In particular embodiments, the fiber cement flooring products of the present invention are coated with a layer of a hydrophobating agent. In particular, it has been found by the present inventors that fiber cement products comprising the specific combination of amorphous silica in the fiber cement composition and a hydrophobation agent (for instance through coating) results in a drastically decreased water absorption by non-hydrophobated areas of the fiber cement flooring products. Indeed, as will become clear from the Examples described herein, it was observed that the combination of amorphous silica in the fiber cement composition and a hydrophobation agent leads to a decreased water uptake by the non-coated edges of the flooring product (which edges may or may not be foreseen of a connecting element) and by the non-coated areas fiber cement layers under the coating.

In further particular embodiments, the fiber cement flooring products according to the present invention are coloured in the mass. In fact, in certain specific embodiments, the fiber cement products as designed by the present inventors and as disclosed herein are esthetically appealing because of their mass-coloured feature, whereby the surface of these products displays (at least part of) the inner texture and colour of the core materials, providing the products with a natural yet modern look. Mass-colouration of the products furthermore provides the additional advantage that any damage that may occur during the life-time of the products will be less visible compared to coated products, which are typically not coloured in the mass.

Fiber cement products that are so-called "coloured in the mass" are products comprising in at least part of their fiber cement structure (i.e. internal fiber cement structure and/or externally exposed and visible fiber cement surface), and preferably but not necessarily throughout their entire fiber cement structure (i.e. internal fiber cement structure and externally exposed and visible fiber cement surface), at least one pigment, such as preferably one or more opaque and/or semi-opaque pigments.

These one or more pigments are preferably present in a total amount of about 2 weight % to about 15 weight %, particularly of about 3 weight % to about 10 weight %, more particularly from about 3 weight % to about 9 weight %, such as particularly of about 3 weight % to about 7 weight %, such as most particularly of about 4 weight % to about 5 weight % (weight % compared to the total dry weight of the fiber cement composition).

Thus, in particular embodiments, "(mass-)coloured fiber cement products" or "fiber cement products coloured in the mass" as referred to interchangeably herein can comprise one or more fiber cement layers that comprise at least one pigment while other fiber cement layers do not. These fiber cement products are also referred to as being partially or partly coloured in the mass, or as being partially or partly mass-coloured, or as being partially or partly through-coloured.

However, in alternative particular embodiments, "(mass-)coloured fiber cement products" or "fiber cement products coloured in the mass" as referred to interchangeably herein may comprise at least one pigment, which is preferably an opaque pigment or a semi-opaque pigment, throughout their entire mass or structure (i.e. comprising internal fiber cement structure and externally exposed and visible fiber cement surface). These fiber cement products are also referred to as being completely, totally or entirely mass-coloured, or as being completely, totally or entirely coloured in the mass, or as being completely, totally or entirely through-coloured.

The one or more pigments present in the fiber cement flooring products of the present invention may be opaque pigments and semi-opaque pigments or a combination thereof and optionally transparent pigments.

Pigments provide color, hiding, and/or are present as extenders. Pigments include those in the form of titanium oxide, iron oxides, calcium carbonate, spinell pigments, titanates, clay, aluminum oxide, silicon dioxide, magnesium oxide, magnesium silicate, barium metaborate monohydrate, sodium oxide, potassium oxide, talc, barytes, zinc oxide, zinc sulfite and mixtures thereof or organic alkaliresistant pigments such as phtalocyanines and azo compounds.

In particular embodiments, the one or more pigments for use in the fiber cement flooring products of the present invention are chosen from the group consisting of brown iron oxides, black iron oxides and white titanium oxides. In further particular embodiments, the one or more pigments for use in the fiber cement flooring products of the present invention are brown iron oxide, black iron oxide and optionally white titanium oxide in a total amount of about 2 to 10 weight % (weight % total pigment compared to the total dry weight of the fiber cement composition). In yet further particular embodiments, the one or more pigments for use in the fiber cement flooring products of the present invention are brown iron oxide, black iron oxide, and optionally white titanium oxide in a total amount of about 3 to 5 weight % (weight % total pigment compared to the total dry weight of the fiber cement composition).

In particular embodiments, the fiber cement products as designed by the present inventors and as disclosed herein are esthetically appealing because of their mass-coloured feature, whereby the surface of these products displays (at least part of) the inner texture and colour of the core materials, providing the products with a natural yet modern look. Mass-colouration of the products furthermore provides the additional advantage that any damage that may occur during the life-time of the products will be less visible compared to coated products, which are typically not coloured in the mass.

In particular embodiments of the present invention, the pigments suitable for use in the fiber cement flooring products of the present invention are essentially alkali-resistant, i.e. resistant to a pH of about 8 or higher, such as resistant to a pH of about 9 or higher, such as resistant to a pH of about 10 or higher, such as resistant to a pH of about 11 or higher, more particularly resistant to a pH of higher than about 12 or higher than about 13.

The fiber cement flooring products of the present invention can be interconnected with each other so as to form a complete uninterrupted floor. Any manner in which floor panels can be joined together is embodied by the present application.

In particular embodiments, the fiber cement flooring products of the present invention comprise a groove and/or a tongue design on preferably at least two sides or edges of the core wherein the sides or edges are opposite to each other. For instance, the flooring products can have a tongue design on one edge and a groove design on the opposite edge. The tongue or groove can have a variety of dimensions, but, preferably, the groove which is present on two opposite edges has an internal depth dimension of from about 5 mm to about 12 mm and a height of from about 3 mm to about 5 mm. The bottom width of the side having the groove is slightly shorter than the upper width of the same side to ensure no gap exists between planks after butting together. With respect to the edges of the floor panels, which are joined together in some fashion, the floor panels can have straight edges or can have a tongue and groove design or there can be some intermediate connecting system used to join the floor panels together such as a spline or other connecting device. Again, any manner in which floor panels can be joined together is embodied by the present application. For purposes of the present invention, the floor panel can have a tongue and groove design or similar connecting design on the side edges of the floor panel. Examples of floor panel designs, shapes, and the like that can be used herein include, but are not limited to, the floor panels described in U.S. Pat. Nos. 6,101,778; 6,023,907; 5,860,267; 6,006,486; 5,797,237; 5,348,778; 5,706,621; 6,094,882; 6,182,410; 6,205,639; 3,200,553; 1,764,331; 1,808,591; 2,004,193; 2,152,694; 2,852,815; 2,882,560; 3,623,288; 3,437,360; 3,731,445; 4,095,913; 4,471,012; 4,695,502; 4,807,416; 4,953,335; 5,283,102; 5,295,341; 5,437,934; 5,618,602; 5,694,730; 5,736,227; and 4,426,820 and U.S. Published Patent Application Nos. 20020031646 and 20010021431 and U.S. patent application Ser. No. 09/460,928, and all are incorporated in their entirety by reference herein.

In one embodiment, a floor panel can have at least two side edges wherein one side edge has a tongue design and the opposite side having a groove design, and wherein the tongue and groove are designed to have a mechanical locking system. These two edges are preferably the longer of the four side edges. The remaining two edges, preferably the short joints, can also have a mechanical locking system, such as the tongue and groove design, or the short joints can have a standard tongue and groove design, wherein one edge has a standard tongue design and the other edge has a standard groove design. The standard design is a design wherein the tongue and groove is not a mechanical locking system but is generally a tongue having a straight tongue design in the middle of the edge and the groove design has the counterpart groove to receive this tongue. Such a design has many advantages wherein a mechanical locking system can be used to connect the long sides of the plank, typically by tilting the tongue into the groove of a previously laid down plank. Then, the standard tongue and groove design on the short edges permits the connecting of the short edge of the plank to the previously laid plank without any tilting motion or lifting of the previous laid planks. The adhesive can be applied to all edges or just to the standard tongue and groove edges.

Thus, the present invention encompasses any type of joint or connecting system that adjoins edges of floor panels together in some fashion with the use of straight edges, grooves, channels, tongues, splines, and other connecting systems. Optionally, the planks can be joined together wherein at least a portion of the planks are joined together at least in part by an adhesive. An example of such a system is described in U.S. patent application Ser. No. 10/205,408, which is incorporated herein in its entirety.

Also, as an option, any edge of the plank can be straight or bevel. Preferably the edges tapered or beveled so that when two cores are brought together for attachment, a valley or V-shaped valley is formed. Preferably, the tapered or beveled edges are at an angle of from about 5° to about 55°, and, more preferably, at about a 15°-45° angle. Also, the length of the beveled or tapered edge can be from about 1.0 mm to about 7.0 mm on each core piece.

In particular embodiments of the present invention, the fiber cement flooring products of the present invention can be surface treated. In further particular embodiments, the fiber cement flooring products are abrasively blasted. In other particular embodiments, the fiber cement flooring products have an embossed surface pattern. In yet other particular embodiments, the fiber cement flooring products have an engraved surface pattern.

In particular embodiments, the fiber cement flooring products of the present invention are fiber cement flooring planks. In alternative particular embodiments, the fiber cement flooring products of the present invention are fiber cement flooring tiles.

In particular embodiments, the fiber cement flooring products of the invention have a thickness of between about 5 mm and about 25 mm, in particular between about 5 mm and about 20 mm.

In particular embodiments, the fiber cement flooring products of the invention have a length of between about 2 m and about 6 m, in particular between about 2 in and about 4 m, more in particular between 2 m and 3 in, such as about 1.20 in.

In particular embodiments, the fiber cement flooring products of the invention have a width of between about 100 mm and about 250 mm, in particular between about 140 mm and about 200 mm, more in particular between about 150 mm and about 200 mm, most in particular of about 200 mm.

The fiber cement products as referred to herein thus include floor covering products made out of fiber cement, such as for instance but not limited to indoor flooring products and outdoor flooring products and the like.

According to particular embodiments, the fiber cement products of the present invention are fiber cement planks.

According to particular embodiments, the fiber cement products of the present invention are fiber cement planks suitable for indoor use and having a thickness of about 5 mm to 8 mm, a width of about 200 mm, and a length of between about 1.20 m and 3 m.

According to particular embodiments, the fiber cement products of the present invention are fiber cement planks suitable for outdoor use and having a thickness of about 20 mm to 25 mm, a width of about 200 mm, and a length of about 4 m.

According to particular embodiments, the fiber cement products of the present invention are fiber cement tiles suitable for indoor use and having a thickness of about 5 mm to 8 mm, a width of about 200 mm to 1000 mm, and a length of about 200 mm to 1000 mm.

According to particular embodiments, the fiber cement products of the present invention are fiber cement tiles suitable for outdoor use and having a thickness of about 20 mm to 25 mm, a width of about 200 mm to 1000 mm, and a length of about 200 mm to 1000 mm.

According to particular embodiments, the fiber cement products of the present invention are fiber cement planks suitable for outdoor use and having a thickness of about 5 mm to 8 mm, a width of about 200 mm, and a length of between about 1.20 m and 3 m.

According to particular embodiments, the fiber cement products of the present invention are fiber cement tiles suitable for outdoor use and having a thickness of about 5 mm to 8 mm, a width of about 200 mm to 1000 mm, and a length of about 200 mm to 1000 mm.

In a second aspect, the present invention provides methods for manufacturing fiber cement flooring products according to the present invention, at least comprising the steps of:
(i) Providing a fiber cement slurry at least comprising fibers, cement, water and between about 2 weight % and about 15 weight % of amorphous silica compared to the total weight of solids in the slurry;
(ii) Manufacturing a fiber cement flooring product by means of a fiber cement production process;
(iii) Curing the fiber cement flooring product.

In the first step (i) of the methods of the present invention, a fiber cement slurry can be prepared by using one or more sources of at least cement, water and fibers in the amounts as previously disclosed herein as well as between about 2 weight % and about 15 weight % of amorphous silica compared to the total weight of solids in the slurry. In certain specific embodiments, these one or more sources of at least cement, water, fibers and silica are operatively connected to a continuous mixing device constructed so as to form a cementitious fiber cement slurry.

Once a fiber cement slurry is obtained, the manufacture of the fiber cement products can be executed according to any known procedure. Indeed, in the methods of the invention, the step (ii) of providing a fiber cement product, can be performed according to any method known in the art for preparing fiber cement products, which products at least comprise water, cement and fibers. The process most widely used for manufacturing fiber cement products is the Hatschek process, which is performed using a modified sieve cylinder paper making machine. Other manufacturing processes that can be used include the Magnani process, injection, flow-on and others. In particular embodiments, the fiber cement products of the present invention are provided by using the Hatschek process. The "green" or uncured fiber cement product is optionally post-compressed usually at pressures in the range from about 22 to about 30 MPa to obtain the desired density.

The processes according to the present invention may further comprise the step of cutting the fiber cement products to a predetermined length to form a fiber cement flooring product. Cutting the fiber cement products to a predetermined length can be done by any technique known in the art, such as but not limited to water jet cutting, air jet cutting or the like. The fiber cement products can be cut to any desirable length and width but preferably to the dimensions as disclosed previously herein for the flooring products of the present invention. Thus, in particular embodiments, the fiber cement flooring products of the present invention can be cut into specific dimensions so as to form fiber cement flooring planks. In alternative particular embodiments, the fiber cement flooring products of the present invention can be cut into specific dimensions so as to form fiber cement flooring tiles.

It will be understood by the skilled person that the processes of the present invention may further comprise additional steps of processing the produced fiber cement products.

For instance, in certain particular embodiments, during the processes of the present invention, the fiber cement slurry and/or the fiber cement products may undergo various intermediate treatments, such as but not limited to treatment with one or more hydrophobic agents, treatment with one or more flocculants, additional or intermediate pressing steps, etc.

As soon as the fiber cement products are formed, these are trimmed at the lateral edges. The border strips can optionally be recycled through immediate mixing with the recycled water and directing the mixture to the mixing system again.

In step (iii) of the methods of the present invention, the obtained fiber cement products are cured. Indeed, after production, fiber cement products can be allowed to cure over a time in the environment in which they are formed, or alternatively can be subjected to a thermal cure (e.g. by autoclaving or the like).

In particular embodiments, the fiber cement flooring products of the present invention are air-cured. This air-curing step involves curing the green fiber cement flooring products under ambient conditions for about 2 to 4 weeks, such as for about 3 weeks.

It has been found by the present inventors that air-cured fiber cement flooring products as produced according to the methods as disclosed herein perform particularly well, especially having regard to their mechanical characteristics, such as impact resistance and mechanical strength. This will become clear from the Examples as further described herein.

In yet further particular embodiments, the "green" fiber cement products may be first pre-cured to the air, after which the pre-cured product is further air-cured until it has its final strength to give the product its final properties.

In particular embodiments of the present invention, the processes may further comprise the step of thermally drying the obtained fiber cement products. After curing, the fiber cement product may still comprise a significant weight of water, present as humidity. This may be up to 10 even 15% w, expressed per weight of the dry product. The weight of dry product is defined as the weight of the product when the product is subjected to drying at 105° C. in a ventilated furnace, until a constant weight is obtained.

In certain embodiments, the fiber cement product is dried. Such drying is done preferably by air drying and is terminated when the weight percentage of humidity of the fiber cement product is less than or equal to 8 weight %, even less than or equal to 6 weight %, expressed per weight of dry product, and most preferably between 2 weight % and 6 weight %, such as about 3 weight % or about 4 weight %.

In particular embodiments, mass-colouration of the products according to the methods of the present invention is achieved by adding one or more pigments during step (i) of providing a fiber cement slurry. In these particular embodiments, the mass-coloured fiber cement flooring products of the present invention are completely coloured in the mass (i.e. throughout their entire structure). In alternative particular embodiments, mass-colouration of the products according to the methods of the present invention is achieved by incorporating (such as by spraying, pouring, or spattering) one or more layers of a pigment slurry in one or more fiber cement layers (which layers compose the eventual fiber cement end product) during a Hatschek or other (e.g. Magnani, extrusion, injection, flow-on) fiber cement process.

A pigment slurry as described herein can be prepared according to any standard method known in the art and can be applied to the fiber cement film (or layer) in e.g. solid, liquid, gas or plasma form. Also, a pigment slurry as described herein can be applied in any form such as for instance as a suspension, as an emulsion, as a solution, as an aerosol etc.

The dispensing device for applying the pigment slurry to the fiber cement film (or layer) can be a flow-on distribution device, a spattering distribution device, a spraying distribution device, a sprinkling distribution device and/or a roll coating distribution device and can be installed at any suitable position of the fiber cement production line.

Adding one or more pigments to a fiber cement film (or layer) so as to mass-colour the fiber cement products can thus be done at any stage during the formation of the fiber cement film (i.e. in the case of a Hatschek or Magnani process) or fiber cement layer (in the case of a flow-on process).

In particular embodiments of the present invention, the methods further comprise the step of surface treating the produced fiber cement flooring products.

Figure 12:
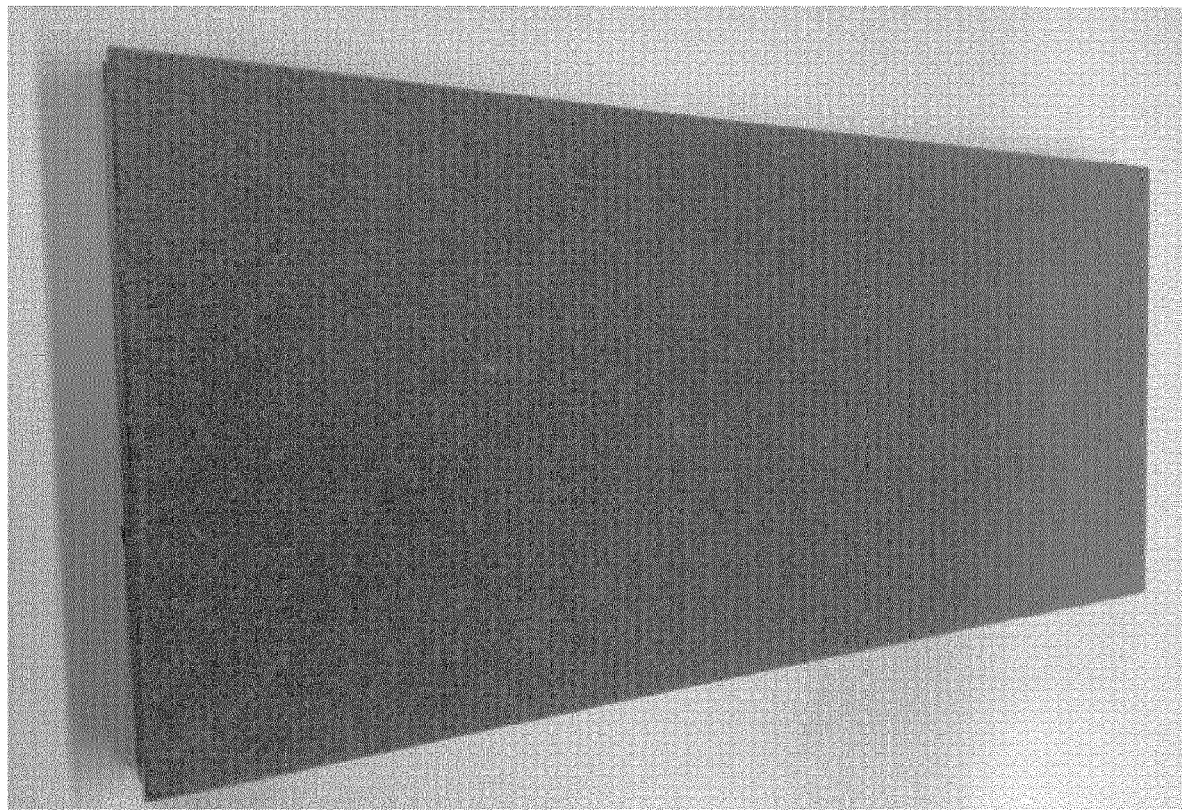
FIG. 12 show fiber cement flooring products with an abrasively blasted surface decorative pattern according to the present invention.

In further particular embodiments, the fiber cement flooring products are abrasively blasted (see e.g. FIG. 12).

Abrasive blasting in the context of the present invention is the abrasion of a surface by forcibly propelling a stream of abrasive material or a stream of abrasive particles against the surface to be treated under high pressure. Such abrasive particles may be mineral particles (e.g. but not limited to sand, garnet, magnesium sulphate, kieserite, . . . ), natural or organic particles (such as but not limited to crushed nut shells or fruit kernels, . . . ), synthetic particles (such as but not limited to corn starch or wheat starch and alike, sodium bicarbonate, dry ice and alike, copper slag, nickel slag, or coal slag, aluminum oxide or corundum, silicon carbide or carborundum, glass beads, ceramic shot/grit, plastic abrasive, glass grit, and alike) metal grit (such as but not limited to steel shot, steel grit, stainless steel shot, stainless steel grit, corundum shot, corundum grit, cut wire, copper shot, aluminum shot, zinc shot) and any combination of these.

In particular embodiments, the abrasive material can be stainless steel grit, such as but not limited to GRITTAL® Rust-proof High-Chromium-Cast-Iron-Grit. In these embodiments, the GRITTAL® Rust-proof High-Chromium-Cast-Iron-Grit particles have a length ranging from about 0.09 mm to about 3.5 mm. In further particular embodiments, the abrasive material is stainless steel grit having a microstructure comprising martensitic stainless steel, optionally with chromium carbides. In these embodiments, the martensitic stainless steel particles have a length ranging from about 0.09 mm to about 3.5 mm. In particular embodiments, the abrasive material are stainless steel shot particles having a diameter ranging from about 0.09 mm to about 3.5 mm.

In other particular embodiments, the abrasive material is CHRONITAL® stainless steel shot. In these embodiments, the CHRONITAL® stainless steel shot particles have a length ranging from about 0.09 mm to about 3.5 mm.

According to other particular embodiments of the invention, the abrasive blasting is abrasive shotblasting performed by using for example a shot blasting wheels turbine, which propels a stream of high velocity particles, such as metal particles, against the surface to be treated using centrifugal force. In further particular embodiments, the abrasive blasting is abrasive shotblasting performed using a Turbostrahler® Shotblasting wheels turbine (Konrad Rump, Oberflächentechnik GMBH & Co, Salzkotten, Germany). In still further particular embodiments, the abrasive blasting is abrasive shotblasting performed using a Turbostrahler® Shotblasting wheels turbine type R320 (Konrad Rump, Oberflächentechnik GMBH & Co, Salzkotten, Germany).

According to certain particular embodiments of the invention, the abrasive blasting is sand blasting performed by using a sand blaster machinery, which propels a stream of high velocity sand sized particles against the surface to be treated using gas under pressure.

In further particular embodiments, the abrasive blasting is sand blasting and the sand sized particles are particles comprising sand.

In still further particular embodiments, the abrasive blasting is sand blasting and the gas under pressure is compressed air.

Figure 13:
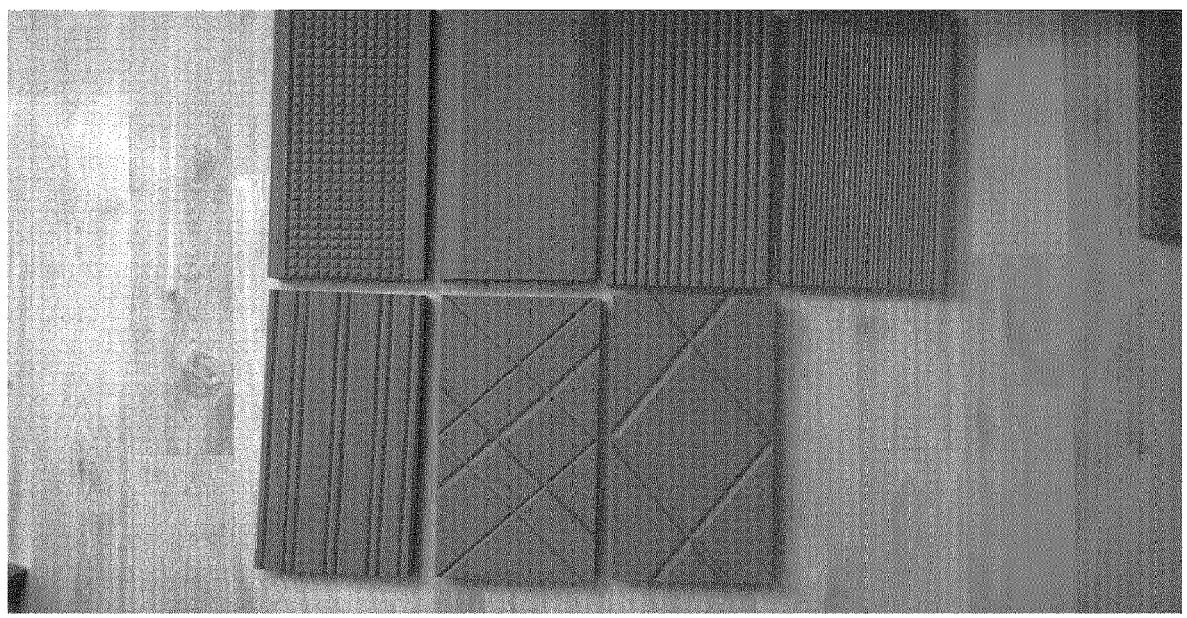
FIG. 13 show fiber cement flooring products with an engraved surface decorative pattern according to the present invention.

In other particular embodiments, the methods of the present invention comprise the step of engraving a decorative pattern in the surface of the fiber cement flooring products. Methods for engraving a pattern, i.e. incising a design, into a hard, usually flat surface by cutting grooves into it, are known in the art. In particular embodiments, the decorative pattern is a structured wood-like pattern. The result is a patterned fiber cement flooring product according to the present invention for instance as shown in FIG. 13.

In other certain particular embodiments, the methods of the present invention comprise the step of embossing a decorative pattern in the surface of the fiber cement flooring products. The step of embossing a decorative pattern in a fiber cement product of the present invention is done prior to the step of curing the product and can be performed by methods known in the art. Accordingly, when the green fiber cement product is formed and is still wet, its surface is treated by pressing a template or a mold, such as but not limited to a metal template or a metal mold, into the wet surface of the green fiber cement product. The result is a patterned fiber cement flooring product according to the present invention, which can then be cured and hardened. In particular embodiments, the decorative pattern is a structured wood-like pattern. Examples of embossed fiber cement flooring products according to the present invention are shown in FIGS. 6 to 10.

In a third aspect, the present invention provides fiber cement flooring products obtainable by any of the methods as disclosed by the present invention.

In a fourth aspect, the present invention provides uses of the fiber cement flooring products as disclosed herein as building materials, in particular for outdoor flooring application (such as decking), indoor flooring applications (such as click flooring), fencing applications and/or covering applications and the like.

The invention will now be further illustrated in detail with reference to the following Examples.

EXAMPLES

It will be appreciated that the following examples, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention that is defined in the following claims and all equivalents thereto. Further, it is recognized that many embodiments may be conceived that do not achieve all of the advantages of some embodiments, yet the absence of a particular advantage shall not be construed to necessarily mean that such an embodiment is outside the scope of the present invention.

Figure 2:
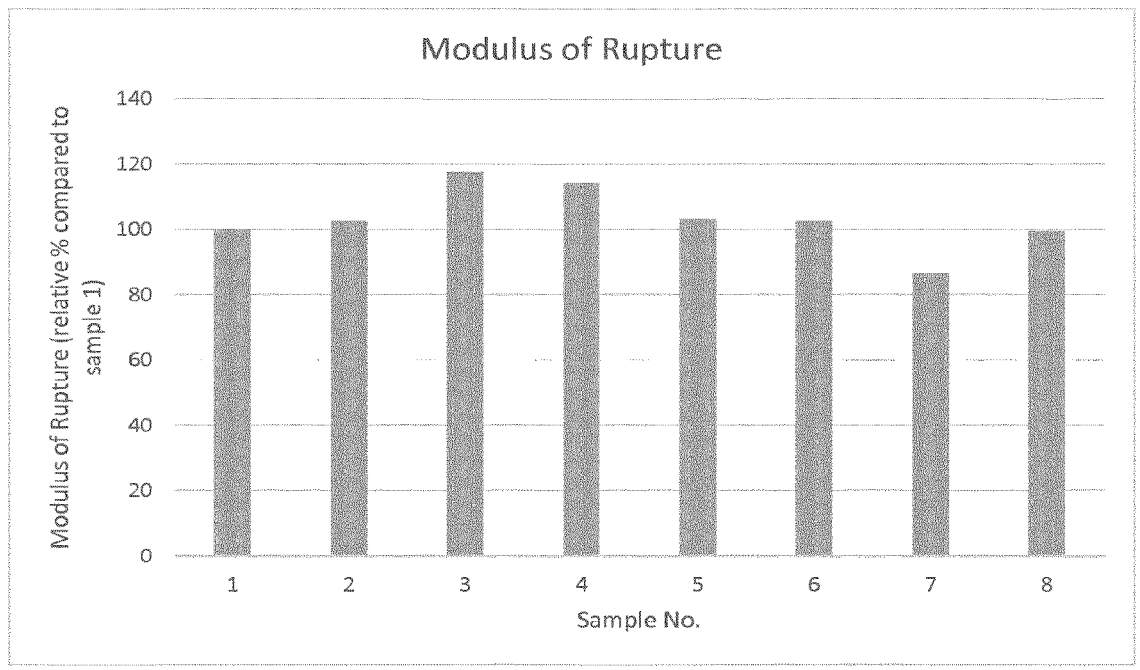
FIG. 2 represents the flexural strength (modulus of rupture; in relative % compared to Sample 1) of fiber cement samples 1 to 8 as produced with the compositions represented in Table 1. Modulus of rupture was measured 29 days after production and air-curing (samples 1 to 6 and 8) or autoclave-curing (sample 7) by making use of a UTS/INSTRON apparatus (type 3345; cel=5000N).
Figure 3:
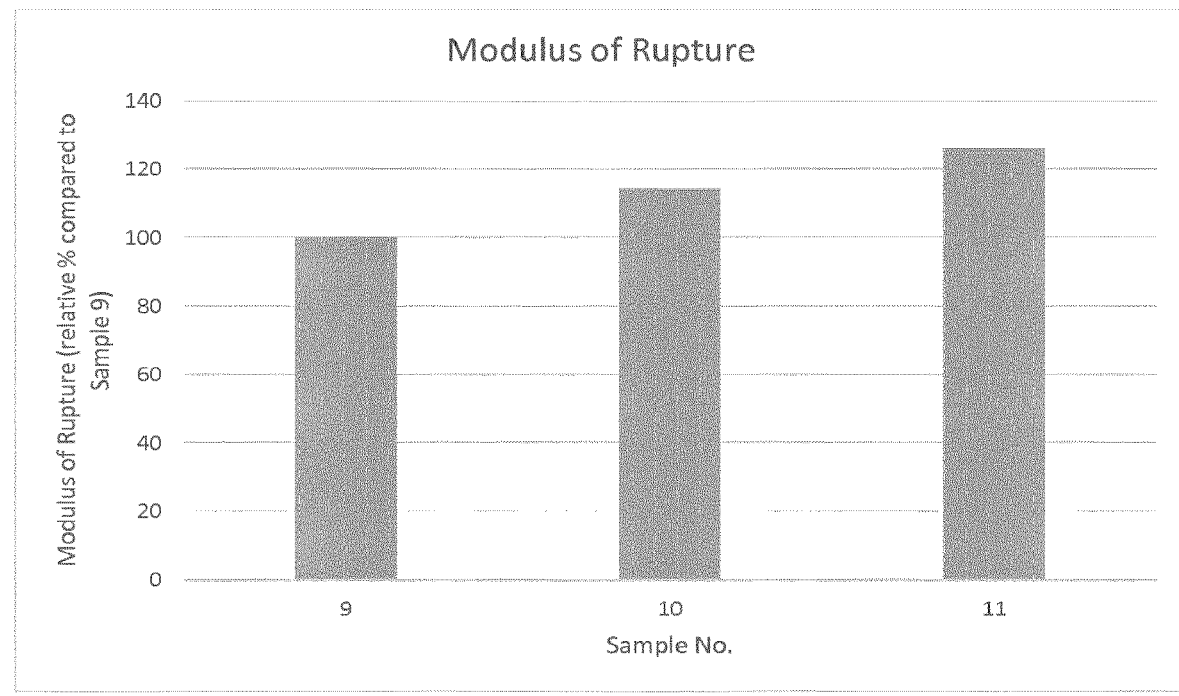
FIG. 3 represents the flexural strength (modulus of rupture; in relative % compared to Sample 9) of fiber cement samples 9 to 11 as produced with the compositions represented in Table 4. Modulus of rupture was measured 29 days after production and air-curing by making use of a UTS/INSTRON apparatus (type 3345; cel=5000N).
Figure 4:
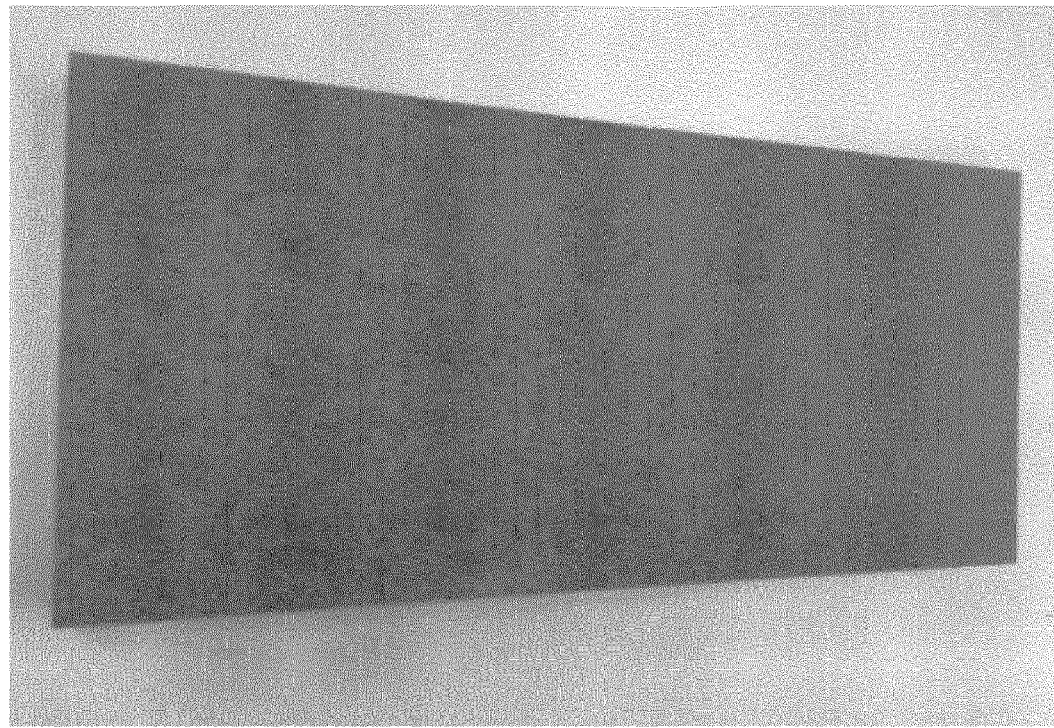
FIGS. 4, 5 and 11 show fiber cement flooring products according to the present invention, which were manufactured by adding one or more pigments on the sieve of the Hatschek machine during the formation of one or more upper fiber cement films. As can be seen from the pictures in FIGS. 4, 5 and 11, this results in a patchy marble-like coloured pattern.
Figure 5:
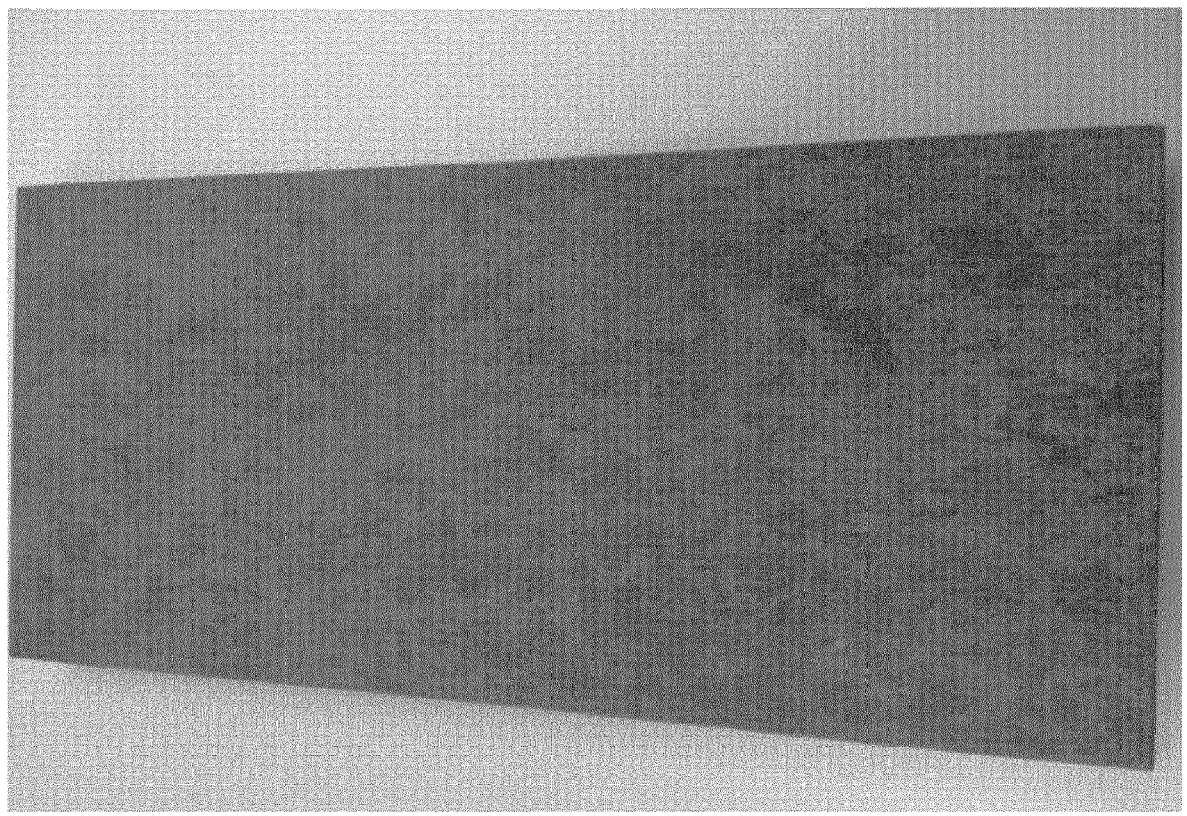
Figure 6:
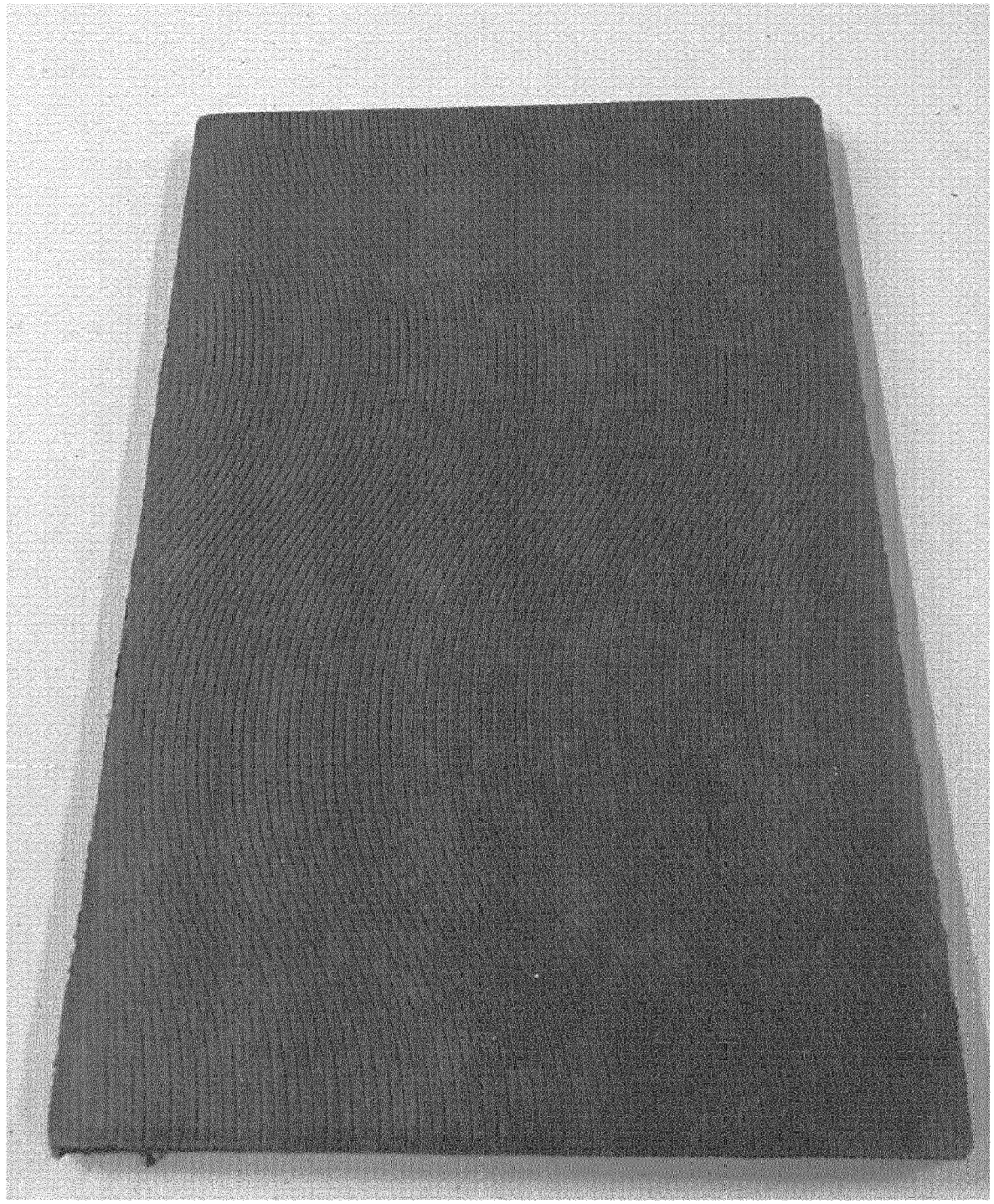
FIGS. 6 to 10 show fiber cement flooring products with an embossed surface decorative pattern according to the present invention.
Figure 7:
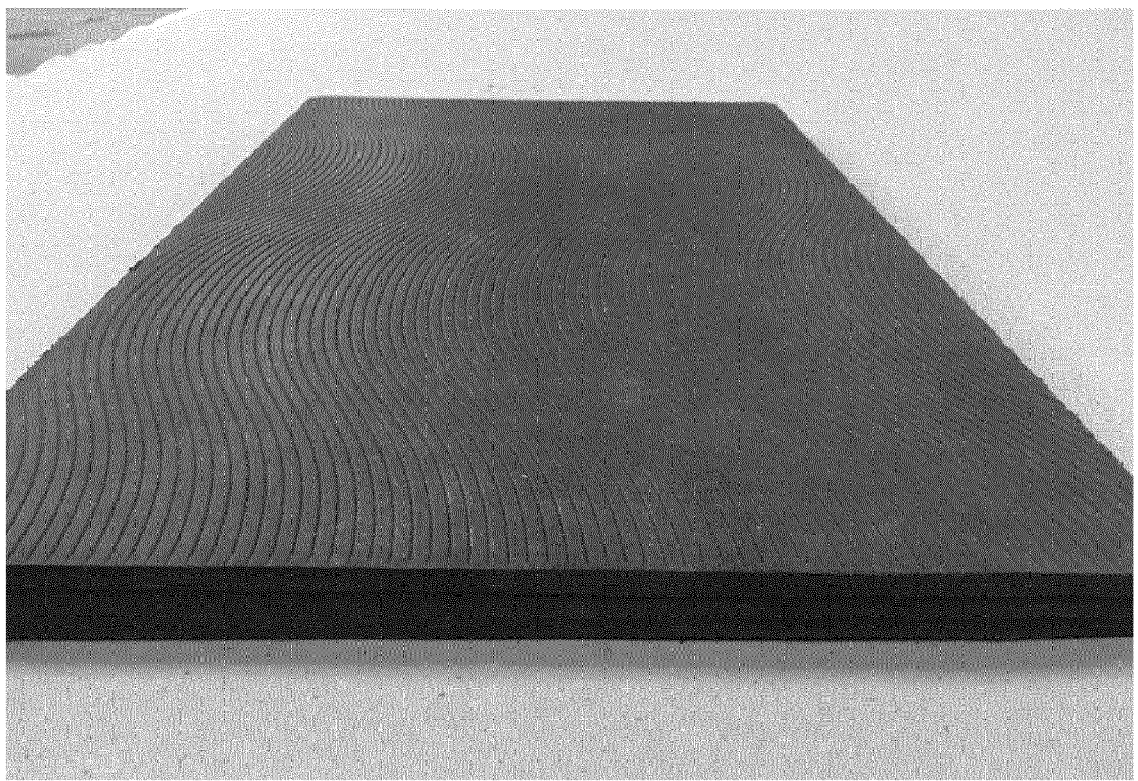
Figure 8:
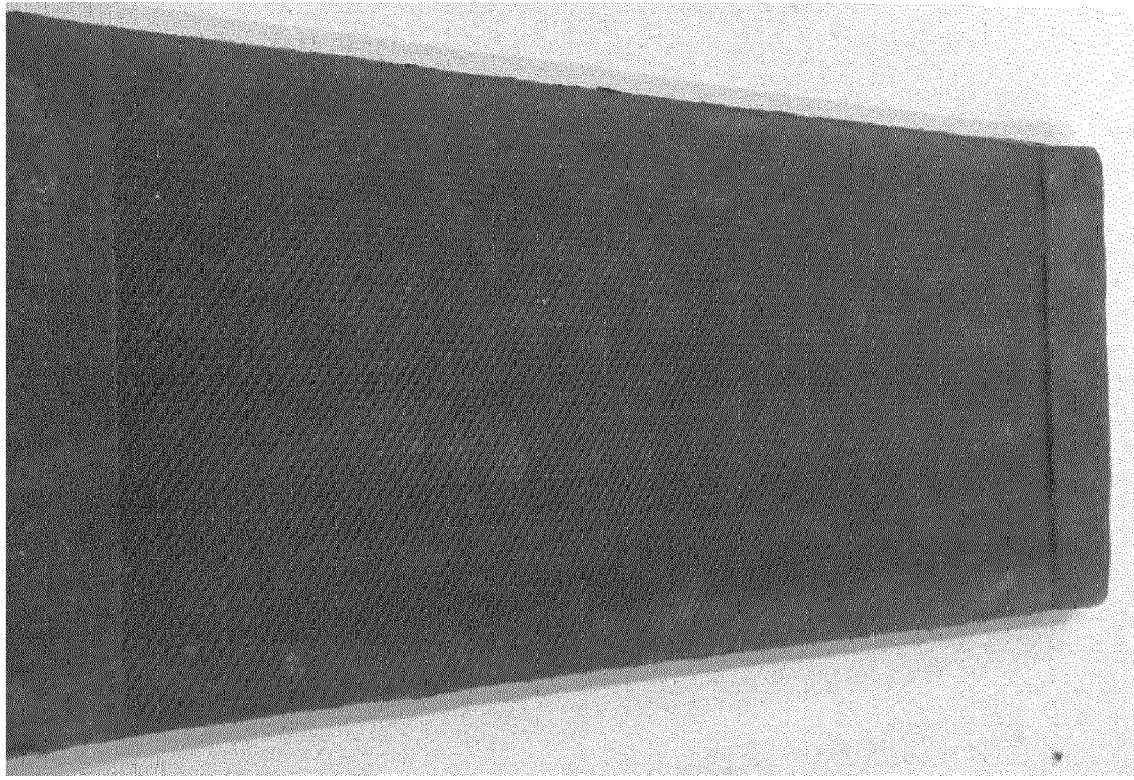
Figure 9:
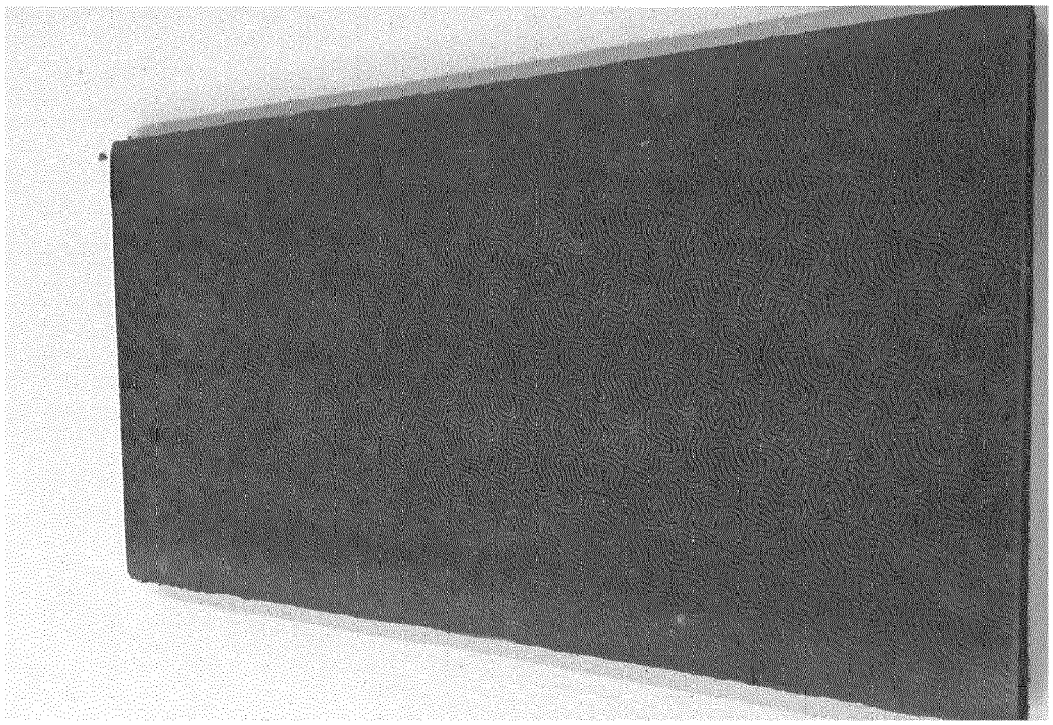
Figure 10:
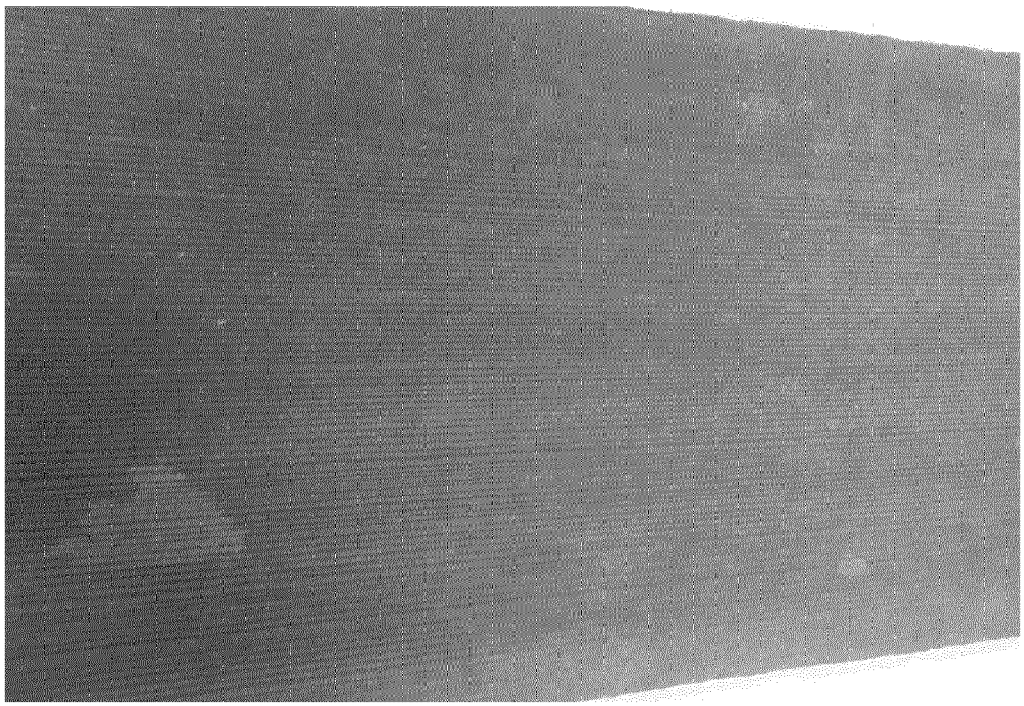
Figure 11:

It will become clear from the experimental results as described below that the fiber cement flooring products of the present invention are characterized by a good mechanical performance and a high Charpy impact resistance (measured according to standard ISO180 or ASTM D256) even after ageing during exposure to carbon dioxide. In addition, the products according to the present invention were demonstrated to have a high flexural modulus (as shown in FIGS. 1 to 3), and importantly, the flooring products of the present invention show a good water resistance. As will also become clear from the results described below, these beneficial properties are effectuated by the specific fiber cement composition of the flooring products of the present invention as described in detail in the present application.

Finally, the fiber cement flooring products of the present invention have an attractive esthetic appearance (as shown in FIGS. 4 to 13).

Example 1: Effect of the Fiber Composition on the Mechanical Properties of Fiber Cement Flooring Products According to the Present Invention Fiber cement products were produced with the methods of the present invention as described herein according to the following specific embodiments.

1.1 Materials & Methods 1.1.1 Production of Fiber Cement Slurry Samples

Different formulations of an aqueous fiber cement slurry were prepared as shown in Table 1. Other additives may have been added to these formulations, without being essential to the findings of the present invention.

1.1.2 Manufacture of Fiber Cement Product on Mini-Hatschek Machine

Cementitious products were manufactured by the Hatschek technique according to a pilot process reproducing the main characteristics of the products obtained by the industrial process.

The green sheets of samples 1 to 6 and 8 were pressed at 230 kg/cm$^2$ and air-cured by subjecting them to a curing at 60° C. for 8 hours, and thereafter curing at ambient conditions. Sample 7 was not air-cured but autoclave-cured for a total of 9 hours, at a pressure between 100 to 150 psi and at a temperature of 148 to 177 degrees Celsius. After two weeks, the formed fiber cement products were analyzed for their physico-mechanical characteristics, i.e. Charpy impact resistance and flexural strength.

1.1.3 Measurement of the Charpy Impact Resistance

The Charpy impact resistance was measured according to standard ASTM D-256-81, using an apparatus Zwick DIN 5102.100/00 on air-dry mini-Hatschek samples of 15 mm*120 mm and a span of 100 mm.

Each of the mini-Hatschek samples were measured in two directions (machine direction and direction perpendicular to this) two weeks after the production.

The impact resistance of the same samples was again measured after ageing in an oven of 600 L at 60° C. and 90% of relative humidity, with injection of 1.5 L $CO_2$/min during 24 hours. The $CO_2$ concentration ranges thus from 7% at the beginning of conditioning to 12% at the end of conditioning.

1.1.4 Measurement of the Flexural Strength

The modulus of rupture (MOR; typically expressed in Pa=kg/m·s$^2$) of each of the mini-Hatschek samples was measured by making use of a UTS/INSTRON apparatus (type 3345; cel=5000N).

1.2 Results 1.2.1 Charpy Impact Resistance of the Fiber Cement Flooring Products of the Present Invention Table 2 and FIG. 1 show the results that were obtained with regard to the Charpy impact resistance of fiber cement products produced with the fiber cement compositions of samples 1 to 8 as presented in Table 1 using the methods of the present invention. The results in Table 2 were derived from average values from several sample tests. It was observed that the Charpy impact resistance of the obtained fiber cement products was significantly improved for air-cured samples comprising synthetic fibers (i.e. all samples vs. sample 7, which was an autoclave-cured sample, exclusively containing natural cellulose fibers). Samples 4, 5 and 6, comprising a combination of different types of synthetic fibers, namely a combination of polypropylene fibers combined with polyvinyl alcohol fibers, performed particularly well (see FIG. 1).

TABLE 1

FC formulations M % samples 1 to 8 (PVA: polyvinyl alcohol; PP: polypropylene; pigment black iron oxide: Omnixon M21320; pigment brown iron oxide: Omnixon EB 31683; ATH: aluminiumtrihydroxide). M % refers to the mass of the component over the total mass of all components except free water, i.e. the dry matter.

| Ingredient (in M %) | Sample 1 | Sample 2 | Sample 3 | Sample 4 | Sample 5 | Sample 6 | Sample 7 | Sample 8 |
|---|---|---|---|---|---|---|---|---|
| Cement | 79.40 | 79.40 | 79.30 | 78.80 | 78.80 | 80.70 | 29.50 | 79.40 |
| Trass (filler) | 5.00 | 5.00 | 5.00 | 5.00 | 5.00 | 5.00 | 0.00 | 5.00 |
| Black iron oxide | 6.75 | 6.75 | 6.75 | 6.75 | 6.75 | 6.75 | 3.38 | 6.75 |
| Brown iron oxide | 2.25 | 2.25 | 2.25 | 2.25 | 2.25 | 2.25 | 1.12 | 2.25 |
| Cellulose fibers | 2.80 | 2.80 | 2.80 | 2.80 | 2.80 | 2.80 | 7.35 | 2.80 |
| *Low strength PVA fibers 2 dtex | 1.90 | 0.00 | 0.00 | 0.00 | 0.00 | 0.00 | 0.00 | 1.90 |
| **High strength PVA fibers 2 dtex | 0.00 | 1.90 | 1.00 | 1.00 | 0.50 | 0.50 | 0.00 | 0.00 |

TABLE 1-continued

FC formulations M % samples 1 to 8 (PVA: polyvinyl alcohol; PP: polypropylene; pigment black iron oxide: Omnixon M21320; pigment brown iron oxide: Omnixon EB 31683; ATH: aluminiumtrihydroxide). M % refers to the mass of the component over the total mass of all components except free water, i.e. the dry matter.

| Ingredient (in M %) | Sample 1 | Sample 2 | Sample 3 | Sample 4 | Sample 5 | Sample 6 | Sample 7 | Sample 8 |
|---|---|---|---|---|---|---|---|---|
| PVA fibers 7 dtex | 0.00 | 0.00 | 1.00 | 1.00 | 1.00 | 1.00 | 0.00 | 0.00 |
| PP fibers | 0.00 | 0.00 | 0.00 | 0.50 | 1.00 | 1.00 | 0.00 | 0.00 |
| Quartz | 0.00 | 0.00 | 0.00 | 0.00 | 0.00 | 0.00 | 37.25 | 0.00 |
| Kaolin | 0.00 | 0.00 | 0.00 | 0.00 | 0.00 | 0.00 | 3.90 | 0.00 |
| ATH | 0.00 | 0.00 | 0.00 | 0.00 | 0.00 | 0.00 | 3.90 | 0.00 |
| Limestone | 0.00 | 0.00 | 0.00 | 0.00 | 0.00 | 0.00 | 7.80 | 0.00 |
| Wollastonite | 0.00 | 0.00 | 0.00 | 0.00 | 0.00 | 0.00 | 5.80 | 0.00 |
| Additives | 1.90 | 1.90 | 1.90 | 1.90 | 1.90 | 0.00 | 0.00 | 1.90 |

*Tenacity of low strength PVA fibers of 2 dtex = 11 to 13 cN/dtex
**Tenacity of high strength PVA fibers of 2 dtex = 13 to 15 cN/dtex

TABLE 2

Relative % values for the Charpy impact resistance of fiber cement products obtained according to the methods of the invention

| Sample (see Table 1) | Charpy impact of fiber cement (in relative % compared to Sample 1) |
|---|---|
| 1 | 100.00 |
| 2 | 106.96 |
| 3 | 128.41 |
| 4 | 177.44 |
| 5 | 177.16 |
| 6 | 188.86 |
| 7 | 44.011 |
| 8 | 109.47 |

1.2.2 Flexural Strength

Table 3 and FIG. 2 show the results that were obtained with regard to the mechanical strength of fiber cement products produced with the fiber cement compositions of samples 1 to 8 as presented in Table 1 using the methods of the present invention. The results in Table 3 were derived from average values from several sample tests. It was observed that the modulus of rupture of the obtained fiber cement products was significantly improved for air-cured samples comprising synthetic fibers (i.e. all samples vs. sample 7, which was an autoclave-cured sample, exclusively containing natural cellulose fibers). Samples 4, 5 and 6, comprising a combination of different types of synthetic fibers, namely a combination of polypropylene fibers combined with polyvinyl alcohol fibers, performed particularly well (see FIG. 2).

TABLE 3

Relative % values for the modulus of rupture of fiber cement products obtained according to the methods of the invention

| Sample (see Table 1) | sMOR (relative % compared to sample 1) (measured under saturated conditions) |
|---|---|
| 1 | 100.00 |
| 2 | 102.61 |
| 3 | 117.69 |
| 4 | 114.26 |
| 5 | 103.33 |
| 6 | 102.66 |
| 7 | 86.68 |
| 8 | 99.64 |

1.3 Conclusion

To conclude, it is clear that fiber cement products manufactured according to the present invention show improved mechanical properties. In particular, air-cured fiber cement products comprising synthetic fibers show a very good impact resistance and a high flexural strength when compared to autoclave-cured products not containing any synthetic fibers.

Example 2: Effect of Amorphous Silica on the Mechanical Properties of the Fiber Cement Flooring Products According to the Present Invention Fiber cement products were produced with the methods of the present invention as described herein according to the following specific embodiments.

2.1 Materials & Methods 2.1.1 Production of Fiber Cement Slurry Samples

Different formulations of an aqueous fiber cement slurry were prepared as shown in Table 4. Other additives may have been added to these formulations, without being essential to the findings of the present invention.

TABLE 4

FC formulations M % samples 9 to 11 (PVA: polyvinyl alcohol; pigment black iron oxide: Omnixon M21320; pigment brown iron oxide: Omnixon EB 31683). M % refers to the mass of the component over the total mass of all components except free water, i.e. the dry matter.

| Ingredient (in M %) | Sample 9 | Sample 10 | Sample 11 |
|---|---|---|---|
| Cement | 83.90 | 84.90 | 81.90 |
| Trass (filler) | 5.00 | 0.00 | 0.00 |
| Black iron oxide | 3.38 | 3.38 | 3.38 |
| Brown iron oxide | 1.13 | 1.13 | 1.13 |
| Cellulose fibers | 2.80 | 2.80 | 2.80 |
| *Low strength PVA fibers 2 dtex | 1.90 | 1.90 | 1.90 |
| Amorphous silica | 0.00 | 4.00 | 7.00 |
| Additives | 1.89 | 1.89 | 1.89 |

*Tenacity of low strength PVA fibers of 2 dtex = 11 to 13 cN/dtex

2.1.2 Manufacture of Fiber Cement Product on Mini-Hatschek Machine

Cementitious products were manufactured by the Hatschek technique according to a pilot process reproducing the main characteristics of the products obtained by the industrial process.

The green sheets of samples 9 to 11 were pressed at 230 kg/cm² and air-cured by subjecting them to a curing at 60° C. for 8 hours, and thereafter curing at ambient conditions. After two weeks, the formed fiber cement products were analyzed for their physico-mechanical characteristics.

2.1.4 Measurement of the Flexural Strength

The modulus of rupture (MOR; typically expressed in Pa=kg/m·s²) of each of the mini-Hatschek samples was measured by making use of a UTS/INSTRON apparatus (type 3345; cel=5000N).

2.2 Results

2.2.1 Flexural Strength

Table 5 and FIG. 3 show the results that were obtained with regard to the mechanical strength of fiber cement products produced with the fiber cement compositions of samples 9 to 11 as presented in Table 4 using the methods of the present invention. The results in Table 5 represent average values from several sample tests. It was observed that the modulus of rupture of the obtained fiber cement products was significantly improved for air-cured samples comprising amorphous silica, in particular in amounts between about 4 weight % and about 7 weight % (weight % compared to the total dry weight of the fiber cement composition).

TABLE 5

Modulus of rupture (relative % compared to sample 9) of fiber cement products obtained according to the methods of the invention

| Sample (see Table 4) | sMOR (relative % compared to sample 9) (measured under saturated conditions) |
|---|---|
| 9 | 100.00 |
| 10 | 114.38 |
| 11 | 126.14 |

2.3 Conclusion

The above results showed that the fiber cement products manufactured according to the present invention show improved mechanical properties. In particular, air-cured fiber cement products comprising amorphous silica show a higher flexural strength when compared to products not containing amorphous silica. In particular, products comprising amounts between about 4 weight % and about 7 weight % of amorphous silica perform very well.

Example 3: Effect of Amorphous Silica on the Water Uptake of the Fiber Cement Flooring Products According to the Present Invention Fiber cement products were produced with the methods of the present invention as described herein according to the following specific embodiments.

3.1 Materials & Methods

3.1.1 Production of Fiber Cement Slurry Samples

Different formulations of an aqueous fiber cement slurry were prepared as shown in Table 5. Other additives may have been added to these formulations, without being essential to the findings of the present invention.

TABLE 5

FC formulations M % samples 12 to 14 (PVA: polyvinyl alcohol)

M % refers to the mass of the component over the total mass of all components except free water, i.e. the dry matter.

| Ingredient (in M %) | Sample 12 | Sample 13 | Sample 14 |
|---|---|---|---|
| Cement | 85.40 | 82.00 | 79.20 |
| Cellulose fibers | 2.80 | 4.00 | 2.80 |
| PVA fibers | 1.90 | 0.00 | 1.00 |
| Amorphous silica | 0.00 | 4.00 | 7.00 |
| Additives | 1.90 | 0.00 | 1.00 |

3.1.2 Manufacture of Fiber Cement Product on Mini-Hatschek Machine

Cementitious products were manufactured by the Hatschek technique according to a pilot process reproducing the main characteristics of the products obtained by the industrial process.

The green sheets of samples 12 to 14 were pressed at 230 kg/cm² and air-cured by subjecting them to a curing at 60° C. for 8 hours, and thereafter curing at ambient conditions. After two weeks, the formed fiber cement products were analyzed for their water absorption characteristics.

3.1.3 Measurement of the Water Uptake

The water uptake of each of the mini-Hatschek samples was measured by making use of a Karsten test. The test was performed both under air-dry and water-saturated conditions (air-dry condition is obtained by conditioning the samples in a ventilated oven at 40° C. during 3 days; water-saturated condition is obtained by immersion of the samples in tap water at room temperature and atmospheric pressure during 3 days. For each of the air-dried and water-saturated samples, the thickness of the sample was determined. Subsequently, a Karsten tube was fixed on a central region of each sample using silicone. After 24 hours, the Karsten tube was filled with demineralized water and closed to prevent evaporation. Water absorption (i.e. the volume of water absorbed from the Karsten tube by the sample) was determined after 1, 2, 4, 6, 8, and 24 hours.

3.2 Results

3.2.1 Water Absorption

Figure 14:
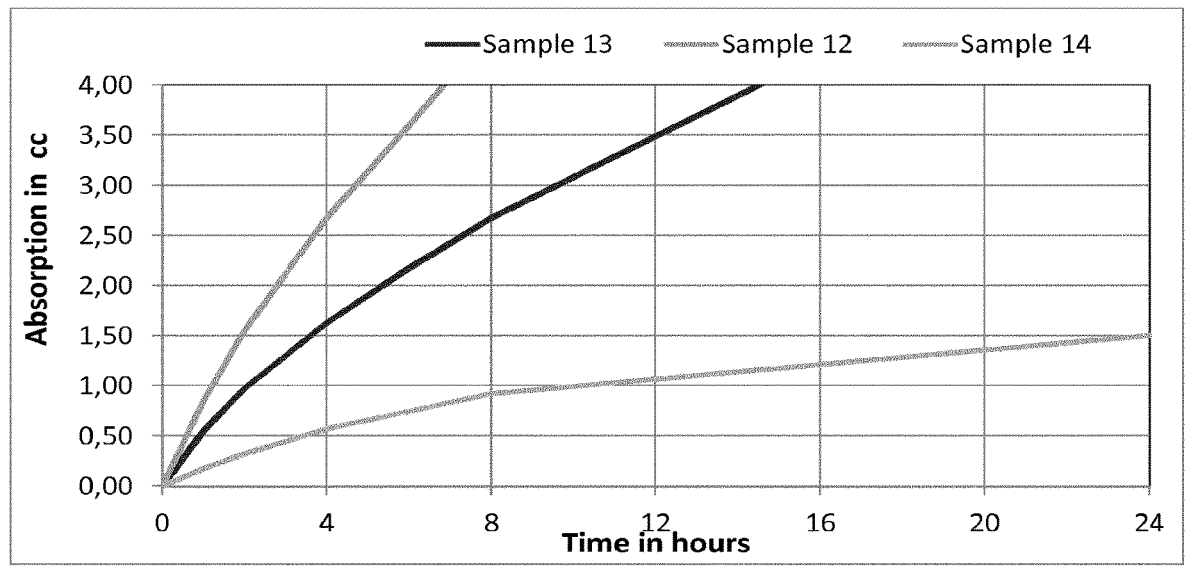
FIG. 14 shows the water absorption in function of time of 3 different test samples (samples 13, 14 and 15 of which the formulation is presented in Table 5) and a reference sample (samples 12 of which the formulation is presented in Table 5), as measured before pressing. The water absorption was measured using a Karsten test as further described herein.

Based on the results from the Karsten tests as presented in FIG. 14, it can be concluded that adding amorphous silica in an amount between about 4 weight % and about 7 weight % significantly decreases the water absorption in samples 13 to 14 as compared to reference sample 12 (the latter of which does not contain amorphous silica).

3.3 Conclusion

The above results showed that the fiber cement products manufactured according to the present invention show improved properties with regard to water resistance. In particular, air-cured fiber cement products comprising amorphous silica show a substantially decreased water uptake when compared to products not containing amorphous silica. In particular, products comprising amounts between about 4 weight % and about 7 weight % of amorphous silica perform very well.

Example 4: Effect of PVA Fibers on the Elasticity of the Fiber Cement Flooring Products According to the Present Invention Fiber cement products were produced with the methods of the present invention as described herein according to the following specific embodiments.

4.1 Materials & Methods

4.1.1 Production of Fiber Cement Slurry Samples

Different formulations of an aqueous fiber cement slurry were prepared as shown in Table 6. Other additives may have been added to these formulations, without being essential to the findings of the present invention.

4.1.2 Manufacture of Fiber Cement Product on Mini-Hatschek Machine

Cementitious products were manufactured by the Hatschek technique according to a pilot process reproducing the main characteristics of the products obtained by the industrial process.

The green sheets of samples 15 to 18 were pressed at 230 kg/cm$^2$ and air-cured by subjecting them to a curing at 60° C. for 8 hours, and thereafter curing at ambient conditions. After two weeks, the formed fiber cement products were analyzed for their physico-mechanical characteristics.

TABLE 6

FC formulations M % samples 15 to 18 (PVA: polyvinyl alcohol). M % refers to the mass of the component over the total mass of all components except free water, i.e. the dry matter.

| Ingredient (in M %) | Sample 15 | Sample 16 | Sample 17 | Sample 18 |
|---|---|---|---|---|
| Cement | 85.40 | 81.40 | 82.10 | 82.00 |
| Trass (filler) | 8.00 | 8.00 | 8.00 | 8.00 |
| Amorphous silica | 0.00 | 4.00 | 4.00 | 6.75 |
| Cellulose fibers | 2.80 | 2.80 | 4.00 | 4.00 |
| *Low strength PVA fibers 2 dtex | 1.90 | 0.00 | 0.00 | 0.00 |
| **High strength PVA fibers 2 dtex | 0.00 | 1.90 | 1.90 | 1.00 |
| PVA fibers 7 dtex | 0.00 | 0.00 | 0.00 | 1.00 |
| Additives | 1.90 | 1.90 | 0.00 | 1.90 |

*Tenacity of low strength PVA fibers of 2 dtex = 11 to 13 cN/dtex
**Tenacity of high strength PVA fibers of 2 dtex = 13 to 15 cN/dtex

4.1.3 Measurement of the Limit of Elastic Deformation

The limit of elastic deformation and the stress at the limit of elastic deformation were measured (see Table 7) by making use of a UTS/INSTRON apparatus (type 3345; cel=5000N) with software Bluehill by Instron (Norm EN12467 and related norms).

4.2 Results

4.2.1 Elastic Deformation

Table 7 shows the results that were obtained with regard to the elastic deformation of fiber cement products produced with the fiber cement compositions of samples 15 to 18 (Table 6) using the methods of the present invention. The results in Table 7 represent average values from several sample tests. It was observed that the modulus of elasticity of the obtained fiber cement products was significantly improved for air-cured samples comprising amorphous silica (in particular in amounts between about 4 weight % and about 7 weight %) in combination with high strength PVA fibers having a tenacity of above 13 cN/dtex.

TABLE 7

Modulus of elasticity (relative % compared to sample 15) of fiber cement products obtained according to the methods of the invention

|  |  | Sample 15 | Sample 16 | Sample 17 | Sample 18 |
|---|---|---|---|---|---|
| E modulus | % of Sample 15 | 100 | 117 | 114 | 111 |
| Deformation at limit of elasticity | % of Sample 15 | 100 | 100 | 113 | 126 |
| Stress at limit of elasticity | % of Sample 15 | 100 | 109 | 119 | 129 |
| Density | % of Sample 15 | 100 | 102 | 100 | 98 |

4.3 Conclusion

The above results showed that the fiber cement products manufactured according to the present invention show improved elasticity compared to conventional fiber cement products. In particular, air-cured fiber cement products comprising amorphous silica in combination with high strength PVA fibers show a higher elasticity (higher degree of bending before breaking) when compared to products not containing amorphous silica combined with high strength PVA fibers. In particular, products comprising amounts between about 4 weight % and about 7 weight % of amorphous silica perform very well.

Example 5: Effect of Amorphous Silica on Internal Cohesion (i.e. Interlaminar Bonding of Layers) in the Fiber Cement Flooring Products According to the Present Invention Fiber cement products were produced with the methods of the present invention as described herein according to the following specific embodiments.

5.1 Materials & Methods

5.1.1 Production of Fiber Cement Slurry Samples

Different formulations of an aqueous fiber cement slurry were prepared as shown in Table 8. Other additives may have been added to these formulations, without being essential to the findings of the present invention.

TABLE 8

FC formulations M % samples 19 to 21 (PVA: polyvinyl alcohol).
M % refers to the mass of the component over the total mass
of all components except free water, i.e. the dry matter.

| Ingredient (in M %) | Sample 19 | Sample 20 | Sample 21 |
|---|---|---|---|
| Cement | 85.40 | 82.00 | 82.20 |
| Trass (filler) | 8.00 | 0.00 | 0.00 |
| Amorphous silica | 0.00 | 4.00 | 4.00 |
| $CaCO_3$ | 0.00 | 8.00 | 8.00 |
| Cellulose fibers | 2.80 | 4.00 | 2.80 |
| *Low strength PVA fibers 2 dtex | 1.90 | 0.00 | 0.00 |
| **High strength PVA fibers 2 dtex | 0.00 | 1.00 | 1.00 |
| PVA fibers 7 dtex | 0.00 | 1.00 | 1.00 |
| Hydrophobant | 0.00 | 0.15 | 0.15 |
| Additives | 1.90 | 1.90 | 0.00 |

*Tenacity of low strength PVA fibers of 2 dtex = 11 to 13 cN/dtex
**Tenacity of high strength PVA fibers of 2 dtex = 13 to 15 cN/dtex

5.1.2 Manufacture of Fiber Cement Product on Mini-Hatschek Machine

Cementitious products were manufactured by the Hatschek technique according to a pilot process reproducing the main characteristics of the products obtained by the industrial process.

The green sheets of samples 19 to 21 were pressed at 230 kg/cm² and air-cured by subjecting them to a curing at 60° C. for 8 hours, and thereafter curing at ambient conditions. After two weeks, the formed fiber cement products were analyzed for their physico-mechanical characteristics.

5.1.3 Measurement of the Interlaminar Cohesion Between Hatschek Layers

The interlaminar bonding between Hatschek layers of Samples 19 to 21 was measured (see Table 9) according to norm EN319.

5.2 Results

5.2.1 Interlaminar Bonding

Table 9 shows the results that were obtained with regard to the interlaminar bonding of Hatschek layers in the fiber cement products produced with the fiber cement compositions of samples 19 to 21 (Table 8) using the methods of the present invention. The results in Table 9 represent average values from several sample tests. It was observed that the internal cohesion of the obtained fiber cement products was significantly improved for air-cured samples comprising amorphous silica (in particular in amounts between about 4 weight % and about 7 weight %) in combination with calcium carbonate.

TABLE 9

Internal cohesion (relative % compared to sample 19) of fiber cement products obtained according to the methods of the invention

| | Sample 19 | Sample 20 | Sample 21 |
|---|---|---|---|
| Internal cohesion (% of Sample 19) | 100 | 167 | 146 |

5.3 Conclusion

The above results showed that the fiber cement products manufactured according to the present invention show improved internal cohesion compared to conventional fiber cement products. In particular, air-cured fiber cement products comprising amorphous silica in combination with $CaCO_3$ show a higher degree of interlaminar bonding when compared to products not containing this specific combination. In particular, products comprising amounts between about 4 weight % and about 7 weight % of amorphous silica and about 8 weight % of $CaCO_3$ perform very well.

Example 6: Effect of Limestone on Dimensional Stability of the Fiber Cement Flooring Products According to the Present Invention Fiber cement products were produced with the methods of the present invention as described herein according to the following specific embodiments.

6.1 Materials & Methods

6.1.1 Production of Fiber Cement Slurry Samples

Different formulations of an aqueous fiber cement slurry were prepared as shown in Table 10. Other additives may have been added to these formulations, without being essential to the findings of the present invention.

TABLE 10

FC formulations M % samples 22 to 29 (PVA: polyvinyl alcohol).
M % refers to the mass of the component over the total mass
of all components except free water, i.e. the dry matter.

| Ingredient (in M %) | Sample 22 | Sample 23 | Sample 24 | Sample 25 | Sample 26 | Sample 27 | Sample 28 | Sample 29 |
|---|---|---|---|---|---|---|---|---|
| Cement | 83.40 | 70.00 | 70.00 | 82.00 | 82.00 | 83.05 | 78.50 | 78.35 |
| Trass (filler) | 10.00 | 10.00 | 10.00 | 0.00 | 0.00 | 0.00 | 0.00 | 0.00 |
| Amorphous silica | 0.00 | 0.00 | 0.00 | 4.00 | 4.00 | 4.00 | 7.00 | 7.00 |
| $CaCO_3$ | 0.00 | 13.50 | 5.00 | 8.00 | 8.00 | 8.00 | 8.00 | 8.00 |

TABLE 10-continued

FC formulations M % samples 22 to 29 (PVA: polyvinyl alcohol).
M % refers to the mass of the component over the total mass
of all components except free water, i.e. the dry matter.

| Ingredient (in M %) | Sample 22 | Sample 23 | Sample 24 | Sample 25 | Sample 26 | Sample 27 | Sample 28 | Sample 29 |
|---|---|---|---|---|---|---|---|---|
| Wollastonite | 0.00 | 0.00 | 8.50 | 0.00 | 0.00 | 0.00 | 0.00 | 0.00 |
| Cellulose fibers | 2.80 | 4.00 | 4.00 | 4.00 | 4.00 | 2.80 | 4.00 | 4.00 |
| PVA fibers | 1.90 | 2.50 | 2.50 | 2.00 | 2.00 | 2.00 | 2.50 | 2.50 |
| Hydrophobant | 0.00 | 0.00 | 0.00 | 0.00 | 0.00 | 0.15 | 0.00 | 0.15 |
| Additives | 1.90 | 0.00 | 0.00 | 0.00 | 0.00 | 0.00 | 0.00 | 0.00 |

6.1.2 Manufacture of Fiber Cement Product on Mini-Hatschek Machine

Cementitious products were manufactured by the Hatschek technique according to a pilot process reproducing the main characteristics of the products obtained by the industrial process.

The green sheets of samples 22 to 29 were pressed at 230 kg/cm² and air-cured by subjecting them to a curing at 60° C. for 8 hours, and thereafter curing at ambient conditions. After two weeks, the formed fiber cement products were analyzed for their physico-mechanical characteristics.

6.1.3 Measurement of the Hydric Movement

The hydric movement of Samples 22 to 29 was measured (see Table 11). The dimensions of samples 22 to 29 were measured in two directions. Subsequently, the samples underwent a cycle of keeping them under water for 3 days and drying for 3 days at 105° C. (in a ventilated oven). After one cycle, the same dimensions of samples 22 to 29 were measured again in the two same directions (these results are given for samples 22 to 28 in Table 11). Sample 29 underwent a second cycle of wetting and drying as described above and was measured again for its dimensions in two directions (these results are given for sample 29 in Table 11).

6.2 Results 6.2.1 Hydric Movement

Table 11 shows the results that were obtained with regard to the dimensional stability of the fiber cement products produced with the fiber cement compositions of samples 22 to 29 (Table 10) using the methods of the present invention. The results in Table 11 represent average values from several sample tests. It was observed that the dimensional stability of the obtained fiber cement products was significantly improved for air-cured samples comprising limestone (in particular in amounts between about 8 weight % and about 15 weight %). In addition, it was observed that the same improvement could be achieved by using only an amount of about 5 weight % of limestone in combination wollastonite.

6.3 Conclusion

The above results showed that the fiber cement products manufactured according to the present invention show a significantly decreased hydric movement compared to conventional fiber cement products. In particular, air-cured fiber cement products comprising $CaCO_3$ show a higher degree of dimensional stability when compared to products not containing $CaCO_3$. In particular, products comprising a combination of $CaCO_3$ and wollastonite perform very well. Furthermore, the combination of amorphous silica, a hydrophobating agent and limestone (see sample 29) is a particularly well performing formulation.

Example 7: Effect of Amorphous Silica on Internal Cohesion (i.e. Interlaminar Bonding of Layers) in the Fiber Cement Flooring Products According to the Present Invention Fiber cement products were produced with the methods of the present invention as described herein according to the following specific embodiments.

7.1 Materials & Methods 7.1.1 Production of Fiber Cement Slurry Samples

Different formulations of an aqueous fiber cement slurry were prepared as shown in Table 12. Other additives may have been added to these formulations, without being essential to the findings of the present invention.

TABLE 11

Hydric movement (in % as compared to sample 22) of fiber cement products obtained according to the methods of the invention

| | Sample 22 | Sample 23 | Sample 24 | Sample 25 | Sample 26 | Sample 27 | Sample 28 | Sample 29 |
|---|---|---|---|---|---|---|---|---|
| Hydric movement (% of Sample 22) | 100 | 89 | 78 | 92 | 85 | 72 | 75 | 40 |

TABLE 12

FC formulations M % samples 30 to 39 (PVA: polyvinyl alcohol).
M % refers to the mass of the component over the total mass
of all components except free water, i.e. the dry matter.

| Ingredient (in M %) | 30 or 40 or 50 or 60 | 31 or 41 or 51 | 32 or 42 or 52 or 61 | 33 or 43 or 53 | 34 or 44 or 54 | 35 or 45 or 55 | 36 or 46 or 56 | 37 or 47 or 57 | 38 or 48 or 58 | 39 or 49 or 59 |
|---|---|---|---|---|---|---|---|---|---|---|
| Cement | 85.40 | 82.00 | 82.00 | 82.00 | 82.00 | 82.20 | 79.20 | 79.20 | 65.20 | 65.20 |
| Trass (filler) | 8.00 | 0.00 | 8.00 | 0.00 | 8.00 | 0.00 | 0.00 | 0.00 | 0.00 | 0.00 |
| Amorphous silica | 0.00 | 4.00 | 4.00 | 4.00 | 4.00 | 4.00 | 7.00 | 7.00 | 4.00 | 4.00 |
| Wollastonite | 0.00 | 0.00 | 0.00 | 0.00 | 0.00 | 0.00 | 0.00 | 0.00 | 0.00 | 8.00 |
| $CaCO_3$ | 0.00 | 8.00 | 0.00 | 8.00 | 0.00 | 8.00 | 8.00 | 8.00 | 25.00 | 17.00 |
| Cellulose fibers | 2.80 | 4.00 | 4.00 | 4.00 | 4.00 | 2.80 | 2.80 | 2.80 | 2.80 | 2.80 |
| *Low strength PVA fibers 2 dtex | 1.90 | 0.00 | 0.00 | 0.00 | 0.00 | 0.00 | 0.00 | 0.00 | 0.00 | 0.00 |
| **High strength PVA fibers 2 dtex | 0.00 | 1.00 | 1.00 | 1.00 | 1.00 | 1.00 | 1.00 | 1.00 | 1.00 | 1.00 |
| PVA fibers 7 dtex | 0.00 | 1.00 | 1.00 | 1.00 | 1.00 | 1.00 | 1.00 | 1.00 | 1.00 | 1.00 |
| Hydrophobant | 0.00 | 0.00 | 0.00 | 0.15 | 0.15 | 0.15 | 0.00 | 0.15 | 0.15 | 0.15 |
| Additives | 1.90 | 0.00 | 0.00 | 0.00 | 0.00 | 1.00 | 1.00 | 1.00 | 1.00 | 1.00 |

*Tenacity of low strength PVA fibers of 2 dtex = 11 to 13 cN/dtex
**Tenacity of high strength PVA fibers of 2 dtex = 13 to 15 cN/dtex 7.1.2 Manufacture of Fiber Cement Product on an Industrial Hatschek Machine Cementitious products were manufactured by an industrial Hatschek process.

The green sheets of samples 30 to 39 were pressed at 230 kg/cm² and air-cured by subjecting them to a curing at 60° C. for 8 hours, and thereafter curing at ambient conditions. After two weeks, the formed fiber cement products were analyzed for their physico-mechanical characteristics.

7.1.3 Measurement of the Interlaminar Cohesion Between Hatschek Layers

The interlaminar bonding between Hatschek layers of Samples 30 to 39 was measured (see Table 13) according to norm EN319.

7.2 Results 7.2.1 Interlaminar Bonding

Table 13 shows the results that were obtained with regard to the interlaminar bonding of Hatschek layers in the fiber cement products produced with the fiber cement compositions of samples 30 to 39 (Table 12) using the methods of the present invention. The results in Table 13 represent average values from several sample tests. It was observed that the internal cohesion of the obtained fiber cement products was significantly improved for air-cured samples comprising amorphous silica (in particular in amounts between about 4 weight % and about 7 weight %) in combination with calcium carbonate.

TABLE 13

Internal cohesion (relative % compared to sample 30) of fiber cement
products obtained according to the methods of the invention

| Sample No. | 30 | 31 | 32 | 33 | 34 | 35 | 36 | 37 | 38 | 39 |
|---|---|---|---|---|---|---|---|---|---|---|
| Internal cohesion (% of Sample 30) | 100 | 145 | 159 | 148 | 143 | 130 | 156 | 146 | 123 | 150 |

7.3 Conclusion

The above results showed that the fiber cement products manufactured according to the present invention show improved internal cohesion compared to conventional fiber cement products. In particular, air-cured fiber cement products comprising amorphous silica show a higher degree of interlaminar bonding when compared to products not containing amorphous silica (see all samples versus sample 30, the latter not containing amorphous silica). Accordingly, products comprising amounts between about 4 weight % and about 7 weight % of amorphous silica perform very well. It was also observed that the presence of $CaCO_3$ and/or wollastonite does not negatively affect the internal cohesion.

Example 8: Effect of Amorphous Silica on the Water Uptake of the Fiber Cement Flooring Products According to the Present Invention Eight fiber cement samples 40 to 47 were produced with the methods of the present invention as described herein according to the following specific embodiments.

8.1 Materials & Methods 8.1.1 Production of Fiber Cement Slurry Samples

The fiber cement formulations of samples 40 to 49 were completely identical to the formulations of samples 30 to 39, respectively, which formulations are outlined in Table 12 above. Other additives may have been added to these formulations, without being essential to the findings of the present invention.

8.1.2 Manufacture of Fiber Cement Product on an Industrial Hatschek Machine

Cementitious products were manufactured by an industrial Hatschek process.

The green sheets of samples 40 to 49 were pressed at 230 kg/cm$^2$ and air-cured by subjecting them to a curing at 60° C. for 8 hours, and thereafter curing at ambient conditions. After two weeks, the formed fiber cement products were analyzed for their physico-mechanical characteristics.

8.1.3 Measurement of the Water Uptake by Means of the Karsten Test

The water uptake of each of the samples 40 to 47 was measured by making use of a Karsten test. The test was performed under air-dry conditions (air-dry condition was obtained by drying the samples in an oven at 40° C. for 48 hours). Subsequently, the samples were cooled down and a Karsten tube was fixed on a central region of each sample using silicone. After 24 hours, the Karsten tube was filled with demineralized water and closed to prevent evaporation. Water absorption (i.e. the volume of water absorbed from the Karsten tube by the sample) was determined after 1, 2, 4, 6, 8, 24, 32 and 48 hours.

8.1.4 Measurement of the Water Uptake by Determining the Water Content of Water-Saturated Samples Versus Air-Dry Samples The water uptake of each of the samples 40 to 49 was also measured by measuring the increase in weight of the water-saturated samples versus air-dried samples (air-dried condition was obtained by drying the samples in an oven at 105° C. for 3 days; water-saturated condition was obtained by immersion of the samples in tap water at room temperature and atmospheric pressure during 3 days). The percentage weight increase of the water-saturated samples versus the air-dried samples was determined.

8.2 Results 8.2.1 Water Absorption (Karsten Test)

Figure 15:
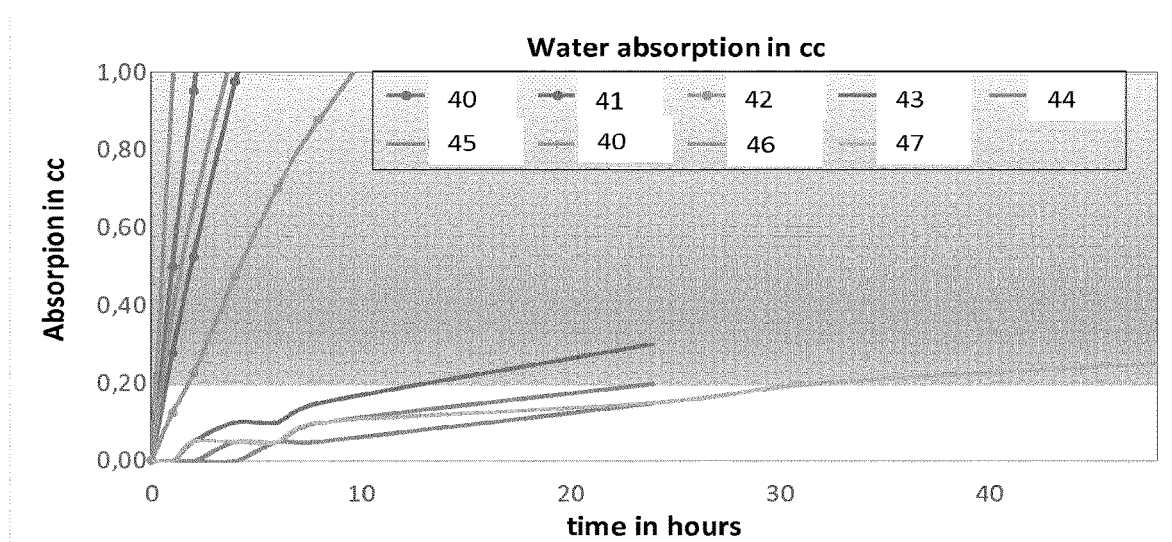
FIG. 15 shows the water absorption in function of time of 7 different test samples (samples 41 to 47 of which the formulation is presented in Table 12) and a reference sample (sample 40 of which the formulation is presented in Table 12), as measured before pressing. The water absorption was measured using a Karsten test as further described herein.

Based on the results from the Karsten test as presented in FIG. 15, it can be concluded that adding a hydrophobing agent to the formulations in a 0.15 weight % amount significantly decreases the water absorption in samples 43 to 45 and 47 as compared for instance to samples 40 to 42.

On the other hand, for sample 46, which does not comprise any hydrophobing agent, it can be observed that amorphous silica in an amount of about 7 weight % significantly decreases the water absorption as compared to sample 40 (the latter of which does not contain amorphous silica).

8.2.2 Water Absorption (% Weight Increase)

Figure 16:
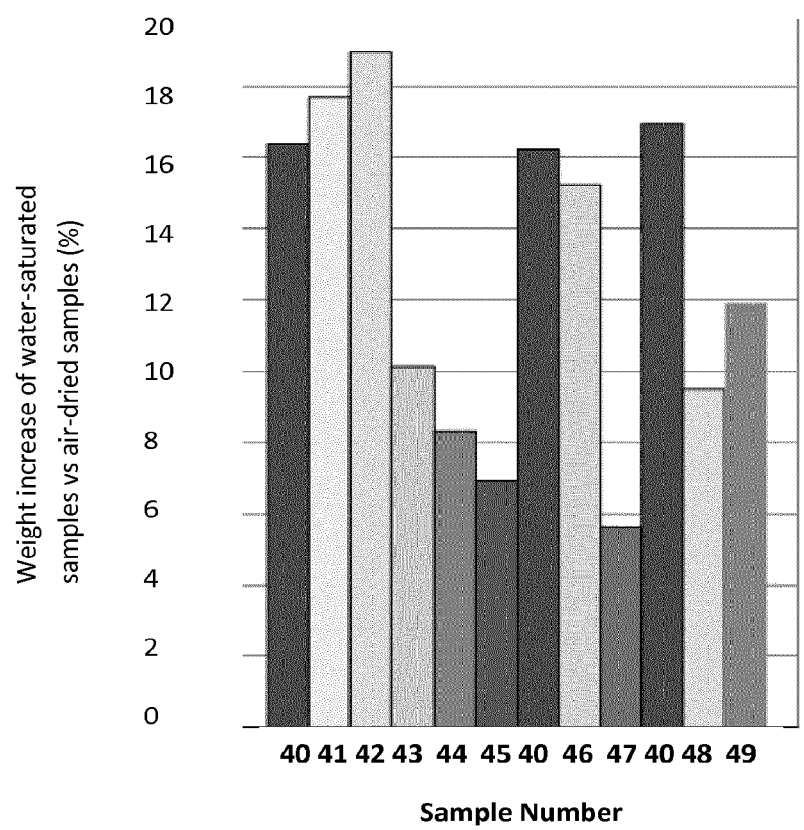
FIG. 16 shows the water absorption for 7 different test samples (samples 41 to 47 of which the formulation is presented in Table 12) and a reference sample (sample 40 of which the formulation is presented in Table 12) as measured by determining for each sample the percentage of weight increase of a water-saturated sample versus an air-dried sample.

Based on the weight increase measurements as presented in FIG. 16, it is confirmed that adding a hydrophobing agent to the formulations in a 0.15 weight % amount significantly decreases the water absorption in samples 43 to 45 and 47 as compared for instance to samples 40 to 42.

However, for sample 46, which does not comprise any hydrophobing agent, it can be observed that amorphous silica in an amount of about 7 weight % significantly decreases the water absorption as compared to sample 40 (the latter of which does not contain amorphous silica).

In samples 48 and 49, the hydrophobing effect of the amorphous silica in combination with the hydrophobing agent has been decreased slightly by the presence of 25% and 17% of limestone, respectively. Nevertheless, these samples still have much less water uptake than sample 40 (the latter of which does not contain amorphous silica nor a hydrophobing agent).

8.3 Conclusion

The above results showed that the fiber cement products manufactured according to the present invention show improved properties with regard to water resistance. In particular, air-cured fiber cement products comprising between about 4 weight % and about 7 weight % of amorphous silica and/or a hydrophobing agent, show a substantially decreased water uptake when compared to products not containing amorphous silica and/or not containing a hydrophobing agent.

Example 9: Effect of Limestone on Dimensional Stability of the Fiber Cement Flooring Products According to the Present Invention Fiber cement products were produced with the methods of the present invention as described herein according to the following specific embodiments.

9.1 Materials & Methods 9.1.1 Production of Fiber Cement Slurry Samples

The fiber cement formulations of samples 50 to 59 were completely identical to the formulations of samples 30 to 39 (of Example 7), respectively, or samples 40 to 49 (of Example 8), respectively, which formulations are outlined in Table 12 above. Other additives may have been added to these formulations, without being essential to the findings of the present invention.

9.1.2 Manufacture of Fiber Cement Product on an Industrial Hatschek Machine

Cementitious products were manufactured by an industrial Hatschek process.

The green sheets of samples 50 to 59 were pressed at 230 kg/cm$^2$ and air-cured by subjecting them to a curing at 60° C. for 8 hours, and thereafter curing at ambient conditions. After two weeks, the formed fiber cement products were analyzed for their physico-mechanical characteristics.

9.1.3 Measurement of the Hygric Movement

The hygric movement of Samples 50 to 59 was measured (see Table 14). The dimensions of samples 50 to 59 were measured in two directions. Subsequently, the samples underwent a cycle of keeping them under water for 3 days and drying for 3 days at 105° C. (in a ventilated oven). After one cycle, the same dimensions of samples 50 to 59 were measured again in the two same directions (these results are given for samples 50 to 59 in Table 14). Samples 50 to 59 underwent a second cycle of wetting and drying as described above and were measured again for their dimensions in two directions (results not shown).

9.2 Results 9.2.1 Hygric Movement

Table 13 shows the results that were obtained with regard to the dimensional stability of the air-cured fiber cement products produced with the fiber cement compositions of samples 50 to 59 (Table 12) using the methods of the present invention. The results in Table 14 represent average values from several sample tests. It was observed that the dimensional stability of the obtained fiber cement products was significantly improved for air-cured samples comprising limestone (in particular in amounts between about 8 weight % and about 25 weight %). In addition, it was observed that the same improvement could be achieved by using a combination of limestone and wollastonite (see sample 59).

TABLE 14

Hygric movement (in % as compared to sample 50) of fiber cement products obtained according to the methods of the invention

| | Sample number | | | | | | | | |
|---|---|---|---|---|---|---|---|---|---|
| 50 | 51 | 52 | 53 | 54 | 55 | 56 | 57 | 58 | 59 |
| Hygric movement (% of Sample 50) 100 | 100.29 | 103.52 | 92.76 | 89.44 | 78.01 | 64.81 | 34.60 | 84.46 | 73.31 |

9.3 Conclusion

The above results showed that the fiber cement products manufactured according to the present invention show a significantly decreased hygric movement compared to conventional fiber cement products. In particular, air-cured fiber cement products comprising $CaCO_3$ show a higher degree of dimensional stability when compared to products not containing $CaCO_3$. In particular, products comprising a combination of $CaCO_3$ and wollastonite perform very well. Furthermore, the combination of amorphous silica, a hydrophobating agent and limestone (see sample 57) is a particularly well performing formulation.

Example 10: Effect of Amorphous Silica on the Mechanical Properties of the Fiber Cement Flooring Products According to the Present Invention Fiber cement products were produced with the methods of the present invention as described herein according to the following specific embodiments.

10.1 Materials & Methods 10.1.1 Production of Fiber Cement Slurry Samples

Two formulations of an aqueous fiber cement slurry were prepared for the preparation of samples 60 and 61 as shown in Table 12. The formulations of samples 60 and 61 were identical to the formulations of samples 30 and 32 (Example 7), samples 40 and 42 (Example 8) and samples 50 and 52 (Example 9) (see Table 12). Other additives may have been added to these formulations, without being essential to the findings of the present invention.

10.1.2 Manufacture of Fiber Cement Product on Mini-Hatschek Machine

Cementitious products were manufactured by the Hatschek technique according to a pilot process reproducing the main characteristics of the products obtained by the industrial process.

The green sheets of samples 60 and 61 were pressed at 230 kg/cm² and air-cured by subjecting them to a curing at 60° C. for 8 hours, and thereafter curing at ambient conditions. After two weeks, the formed fiber cement products were analyzed for their physico-mechanical characteristics.

10.1.3 Measurement of the Flexural Strength

The modulus of rupture (MOR; typically expressed in $Pa=kg/m \cdot s^2$) of each of the mini-Hatschek samples was measured by making use of a UTS/INSTRON apparatus (type 3345; cel=5000N).

10.2 Results 10.2.1 Flexural Strength

Table 15 shows the results that were obtained with regard to the mechanical strength of fiber cement products produced with the fiber cement compositions of samples 60 and 61. The results in Table 15 represent average values from several sample tests. It was observed that the modulus of rupture of the obtained fiber cement products was significantly improved for air-cured samples comprising amorphous silica, in particular in amounts between about 4 weight % and about 7 weight % (weight % compared to the total dry weight of the fiber cement composition).

TABLE 15

Modulus of rupture (relative % compared to sample 60) of fiber cement products obtained according to the methods of the invention

| Sample (see Table 12) | sMOR (relative % compared to sample 60) (measured under saturated conditions) |
|---|---|
| 60 | 100.00 |
| 61 | 119.35 |

10.3 Conclusion

The above results showed that the fiber cement products manufactured according to the present invention show improved mechanical properties. In particular, air-cured fiber cement products comprising amorphous silica show a higher flexural strength when compared to products not containing amorphous silica. In particular, products comprising amounts between about 4 weight % and about 7 weight % of amorphous silica perform very well.

The invention claimed is:
1. An air-cured fiber cement product comprising cement and fibers, wherein:
said fiber cement product comprises amorphous silica in an amount of between 4 weight % and 15 weight % compared to the total dry weight of the fiber cement composition of said fiber cement product;

said fiber cement product further comprises a hydrophobic agent;
said fibers comprise synthetic fibers;
comprising on at least part of its outer surface one or more coating layers; and
said one or more coating layers comprise first a coating, which is a primer layer and a second coating chosen from the group of a waterborne acrylic top coat layer and a waterglass based coating.

2. The fiber cement product according to claim 1, wherein the hydrophobic agent is applied in the mass during production of the fiber cement products.

3. The fiber cement product according to claim 1, wherein the hydrophobic agent is coated onto the fiber cement product.

4. The fiber cement product according to claim 1, further comprising limestone in an amount between 5 weight % and 25 weight % compared to the total dry weight of the fiber cement composition of said fiber cement product.

5. The fiber cement product according to claim 1, wherein said synthetic fibers comprise polyvinyl alcohol fibers.

6. The fiber cement product according to claim 5, wherein at least part of said polyvinyl alcohol fibers have a tenacity of above 13 cN/dtex.

7. The fiber cement product according to claim 1, further comprising wollastonite in an amount between 5 weight % and 20 weight % compared to the total dry weight of the fiber cement composition of said fiber cement product.

8. An air-cured fiber cement product, wherein:
said fiber cement product comprises amorphous silica in an amount of between 4 weight % and 15 weight % compared to the total dry weight of the fiber cement composition of said fiber cement product;
said fiber cement product further comprises a hydrophobic agent;
said fibers comprise synthetic fibers;
comprising on at least part of its outer surface one or more coating layers; and
said one or more coating layers comprise a protective top coating incorporating abrasive resistance particles.

9. The fiber cement product as claimed in claim 8, wherein said abrasive resistance particles are chosen from the group of corundum and silicate particles.

10. The fiber cement product according to claim 1, which is coloured in the mass.

11. The fiber cement product according to claim 1, wherein said fiber cement product comprises a groove and/or tongue design on opposed side edges of the product.

12. The fiber cement product according to claim 1, wherein said fiber cement product is a floor panel.

13. The fiber cement product according to claim 1, wherein said fibers comprise synthetic fibers and cellulose fibers.

14. The fiber cement product as claimed in claim 13, wherein said fiber cement product comprises between 2 and 4 weight % of cellulose fibers compared to the total dry weight of the fiber cement composition of said fiber cement product.

15. The fiber cement product according to claim 1, wherein said one or more coating layers comprise a protective top coating incorporating abrasive resistance particles.

16. The fiber cement product as claimed in claim 15, wherein said abrasive resistance particles are chosen from the group of corundum and silicate particles.

* * * * *